United States Patent
Ishitsuka

(10) Patent No.: US 10,623,647 B2
(45) Date of Patent: Apr. 14, 2020

(54) IMAGE CAPTURING APPARATUS AND CONTROL METHOD FOR CHANGING A SETTING BASED ON A TOUCH OPERATION ON A DISPLAY

(71) Applicant: CANON KABUSHIKI KAISHA, Tokyo (JP)

(72) Inventor: Yuichiro Ishitsuka, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 14 days.

(21) Appl. No.: 15/865,580

(22) Filed: Jan. 9, 2018

(65) Prior Publication Data
US 2018/0198985 A1   Jul. 12, 2018

(30) Foreign Application Priority Data
Jan. 10, 2017   (JP) .................................. 2017-002114

(51) Int. Cl.
| | | |
|---|---|---|
| *H04N 5/232* | (2006.01) | |
| *G06F 3/041* | (2006.01) | |
| *G06F 3/0488* | (2013.01) | |
| *H04N 9/73* | (2006.01) | |

(52) U.S. Cl.
CPC ....... *H04N 5/23293* (2013.01); *G06F 3/0416* (2013.01); *G06F 3/0488* (2013.01); *H04N 5/23209* (2013.01); *H04N 5/23216* (2013.01); *H04N 5/232127* (2018.08); *H04N 5/232935* (2018.08); *H04N 5/23245* (2013.01); *H04N 9/735* (2013.01)

(58) Field of Classification Search
CPC .......... H04N 5/23216; H04N 5/23293; H04N 5/22525; G06F 3/0416; G06F 3/048
See application file for complete search history.

(56) References Cited

U.S. PATENT DOCUMENTS

| | | | |
|---|---|---|---|
| 9,298,305 B2 | 3/2016 | Ishitsuka | |
| 2011/0019058 A1* | 1/2011 | Sakai | G06F 3/04847 348/333.01 |
| 2011/0028096 A1* | 2/2011 | Tokunaga | H04W 4/21 455/41.2 |

(Continued)

FOREIGN PATENT DOCUMENTS

JP     2012-203143 A     10/2012

*Primary Examiner* — Sinh Tran
*Assistant Examiner* — Selam T Gebriel
(74) *Attorney, Agent, or Firm* — Carter, DeLuca & Farrell LLP

(57) ABSTRACT

An image capturing apparatus comprises a detection unit configured to detect a touch operation performed on a display unit that is arranged out of a viewfinder, and a control unit configured to perform control such that, in a case where an object image is visible via the viewfinder, in accordance with detection of a start of touching at a first position on the display unit by the detection unit, the display unit displays that an item at the first position was touched, and in accordance with a touch position movement operation that satisfies a predetermined condition being performed after the first position was touched, an in-finder display unit that is visible via the viewfinder displays that a setting of a predetermined setting item is changed according to movement of a touch position from the first position.

25 Claims, 12 Drawing Sheets

(56) References Cited

U.S. PATENT DOCUMENTS

| | | | | |
|---|---|---|---|---|
| 2011/0267526 A1* | 11/2011 | Ishihara | ................... | G03B 3/10 |
| | | | | 348/333.01 |
| 2013/0141362 A1* | 6/2013 | Asanuma | ................ | G06F 3/041 |
| | | | | 345/173 |
| 2013/0141624 A1* | 6/2013 | Tomizawa | ......... | H04N 5/23293 |
| | | | | 348/333.02 |
| 2014/0049677 A1* | 2/2014 | Kawaguchi | ........ | H04N 5/23216 |
| | | | | 348/333.01 |
| 2014/0098273 A1* | 4/2014 | Ito | ...................... | H04N 5/23216 |
| | | | | 348/333.03 |
| 2014/0176773 A1* | 6/2014 | Sakuma | ............. | H04N 5/23293 |
| | | | | 348/333.02 |

\* cited by examiner

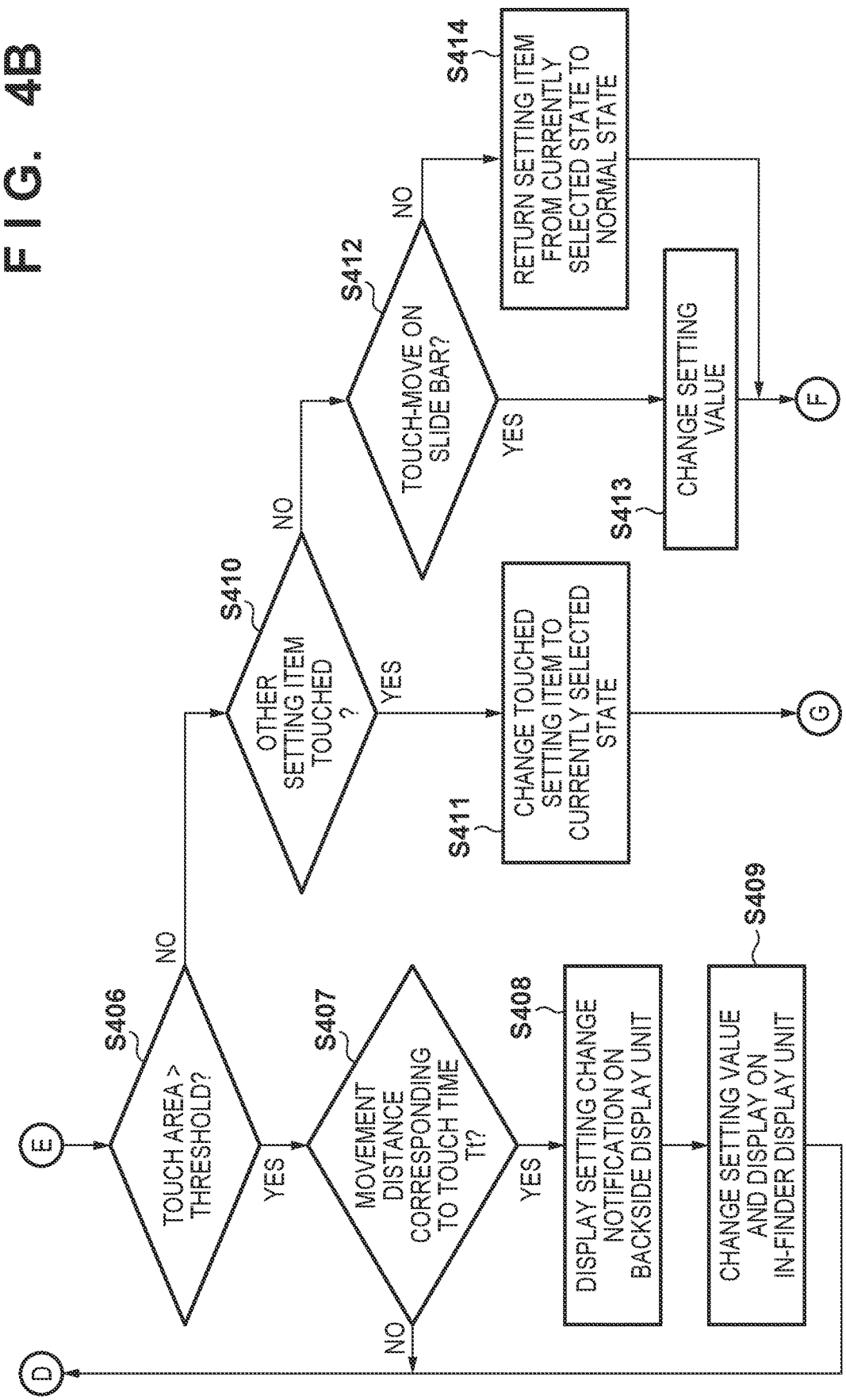

IMAGE CAPTURING APPARATUS AND CONTROL METHOD FOR CHANGING A SETTING BASED ON A TOUCH OPERATION ON A DISPLAY

BACKGROUND OF THE INVENTION

Field of the Invention

The present invention relates to technology for changing a setting in accordance with a touch operation performed on a display unit arranged out of a viewfinder in the case where an object is visible to a user via the viewfinder.

Description of the Related Art

Conventionally, there is a method of setting a setting item such as the AF position or the shutter speed while looking through a viewfinder, by using a display unit arranged out of the viewfinder as a touch panel when the viewfinder is being looked through. Japanese Patent Laid-Open No. 2012-203143 discloses that an eye sensor is used to detect whether or not a user is looking through a viewfinder, and the touch operation method is changed according to the detection result from the eye sensor. In Japanese Patent Laid-Open No. 2012-203143, if it is determined that the user is looking through the viewfinder, processing is performed to accept a touch operation that is performed on a backside monitor while looking through the viewfinder. Also, if the eye sensor does not detect that the user is looking through the viewfinder, processing is performed to accept a touch operation that is performed on a button or the like in a setting screen that is displayed on the backside monitor.

In Japanese Patent Laid-Open No. 2012-203143, whether or not the user is looking through the viewfinder needs to be detected by the eye sensor, and therefore in the case of a digital camera that does not have a proximity detection member such as an eye sensor, it is not possible to change the touch operation method according to whether or not the user is looking through the viewfinder. Because a proximity detection member is not provided, the user cannot change a setting by performing a touch operation on the display unit that is on the back side while looking through the viewfinder.

SUMMARY OF THE INVENTION

The present invention has been made in consideration of the aforementioned problems, and enables a user to perform a touch operation with favorable operability while looking through a viewfinder, even with an image capturing apparatus that does not have a proximity detection member.

In order to solve the aforementioned problems, the present invention provides an image capturing apparatus comprising: a detection unit configured to detect a touch operation performed on a display unit that is arranged out of a viewfinder; and a control unit configured to perform control such that, in a case where an object image is visible via the viewfinder, in accordance with detection of a start of touching at a first position on the display unit by the detection unit, the display unit displays that an item at the first position was touched, and in accordance with a touch position movement operation that satisfies a predetermined condition being performed after the first position was touched, an in-finder display unit that is visible via the viewfinder displays that a setting of a predetermined setting item is changed according to movement of a touch position from the first position.

In order to solve the aforementioned problems, the present invention provides a control method of an image capturing apparatus which has a detection unit configured to detect a touch operation performed on a display unit that is arranged out of a viewfinder, the method comprising: in a case where an object image is visible via the viewfinder, in accordance with detection of a start of touching at a first position on the display unit by the detection unit, displaying on the display unit that an item at the first position was touched, and in accordance with a touch position movement operation that satisfies a predetermined condition being performed after the first position was touched, displaying on an in-finder display unit, which is visible via the viewfinder, that a setting of a predetermined setting item is changed according to movement of a touch position from the first position.

In order to solve the aforementioned problems, the present invention provides a non-transitory computer-readable storage medium storing a program for causing a computer to execute a control method of an image capturing apparatus which has a detection unit configured to detect a touch operation performed on a display unit that is arranged out of a viewfinder, the method comprising: in a case where an object image is visible via the viewfinder, in accordance with detection of a start of touching at a first position on the display unit by the detection unit, displaying on the display unit that an item at the first position was touched, and in accordance with a touch position movement operation that satisfies a predetermined condition being performed after the first position was touched, displaying on an in-finder display unit, which is visible via the viewfinder, that a setting of a predetermined setting item is changed according to movement of a touch position from the first position.

Further features of the present invention will become apparent from the following description of exemplary embodiments (with reference to the attached drawings).

BRIEF DESCRIPTION OF THE DRAWINGS

FIGS. 4A and 4B are flowcharts showing processing in which a touch operation is performed during display of a standby screen at the time of shooting in the present embodiment.

DESCRIPTION OF THE EMBODIMENTS

An exemplary embodiment of the present invention will be described in detail below with reference to the accompanying drawings.

It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment.

Embodiments upon application of the present invention to an image capturing apparatus such as a digital single-lens reflex camera capable of shooting a still image and/or moving image will be described in detail hereinafter with reference to the drawings.

Apparatus Configuration

The external configuration and functions of a digital camera according to the present embodiment will be described below with reference to FIGS. 1A, 1B, 2A and 2B.

Figure 1A:
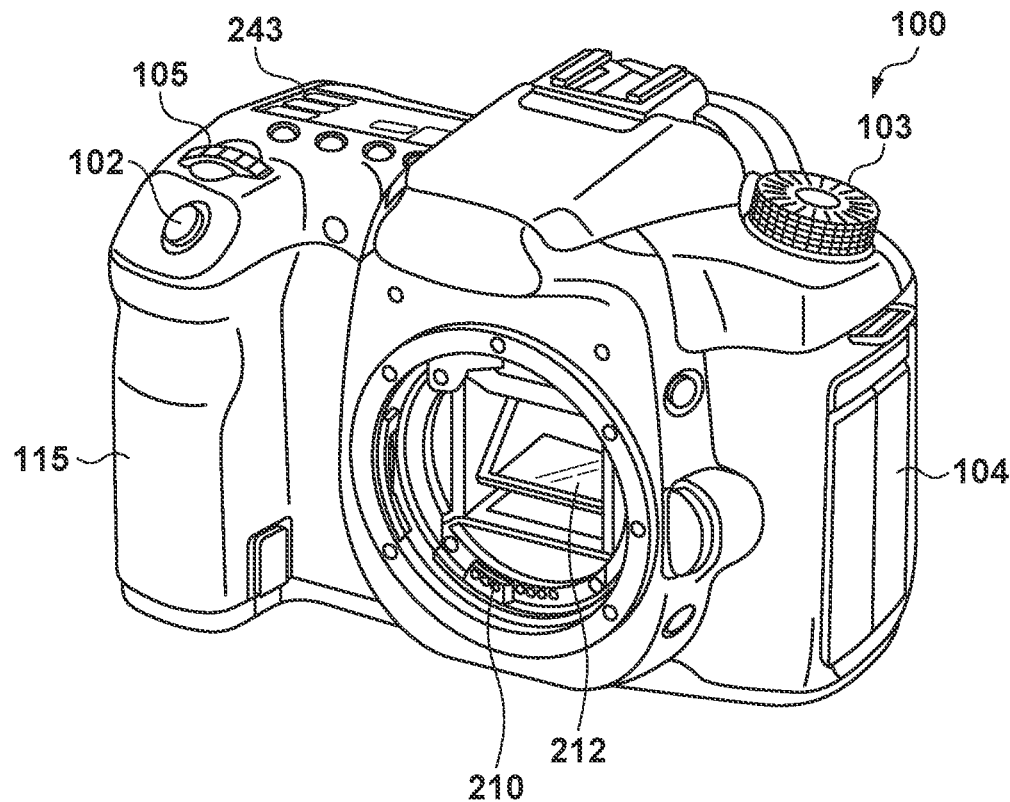
FIGS. 1A and 1B show the outer appearance of an image capturing apparatus of the present embodiment.
Figure 1B:
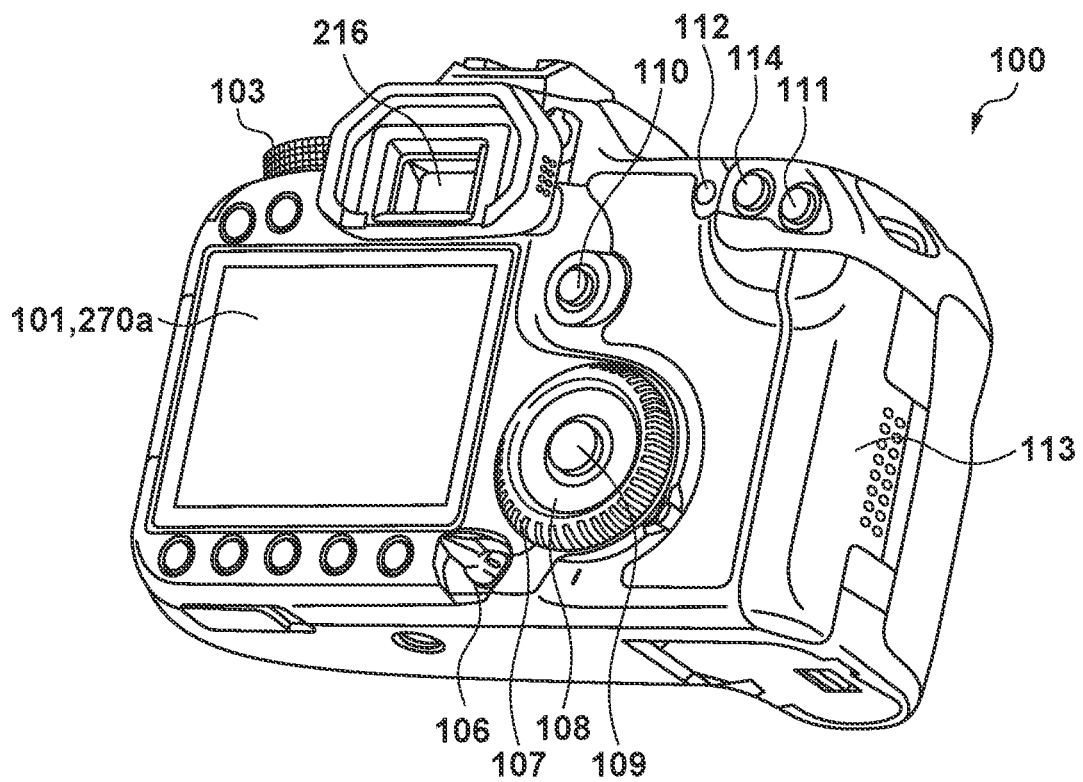

In FIGS. 1A and 1B, a backside display unit 101 is a display device for displaying images and various types of information, such as an LCD provided on the back surface of the camera body. Moreover, the backside display unit 101 has a function of reproducing a still image after the still image was shot, a function of displaying a moving image that is being recorded, and a live view display (through-the-lens display) function as well. An out-of-finder display unit 243 is a display device such as an LCD provided on the upper surface of the camera body, and displays various setting values of the camera such as a shutter speed and a diaphragm aperture.

A shutter-release button 102 is an operation unit for giving a shooting instruction. A mode selection switch 103 is a dial type operation unit for switching between various modes. A terminal cover 104 is a cover member for protecting a connector (not illustrated) for connecting an external device and the digital camera 100 via a cable such as a USB cable. A main electronic dial 105 is a rotating operation member included in operation units 270 that will be described later with reference to FIGS. 2A and 2B, and by rotating this main electronic dial 105, setting values such as a shutter speed and a diaphragm aperture can be changed.

A power supply switch 106 is an operation member for the switching on/off of the power supply to the digital camera 100. A sub electronic dial 107 is also a rotating operation member included in the operation units 270 that will be described later with reference to FIGS. 2A and 2B, and can move a selected frame, scroll images, and the like. A cross key 108 is a movement instruction member also included in the operation units 270 that will be described later with reference to FIGS. 2A and 2B, and can perform, by one of UP, DOWN, LEFT and RIGHT being pressed down, an operation that corresponds to the pressed portion of the cross key 108.

Figure 2A:
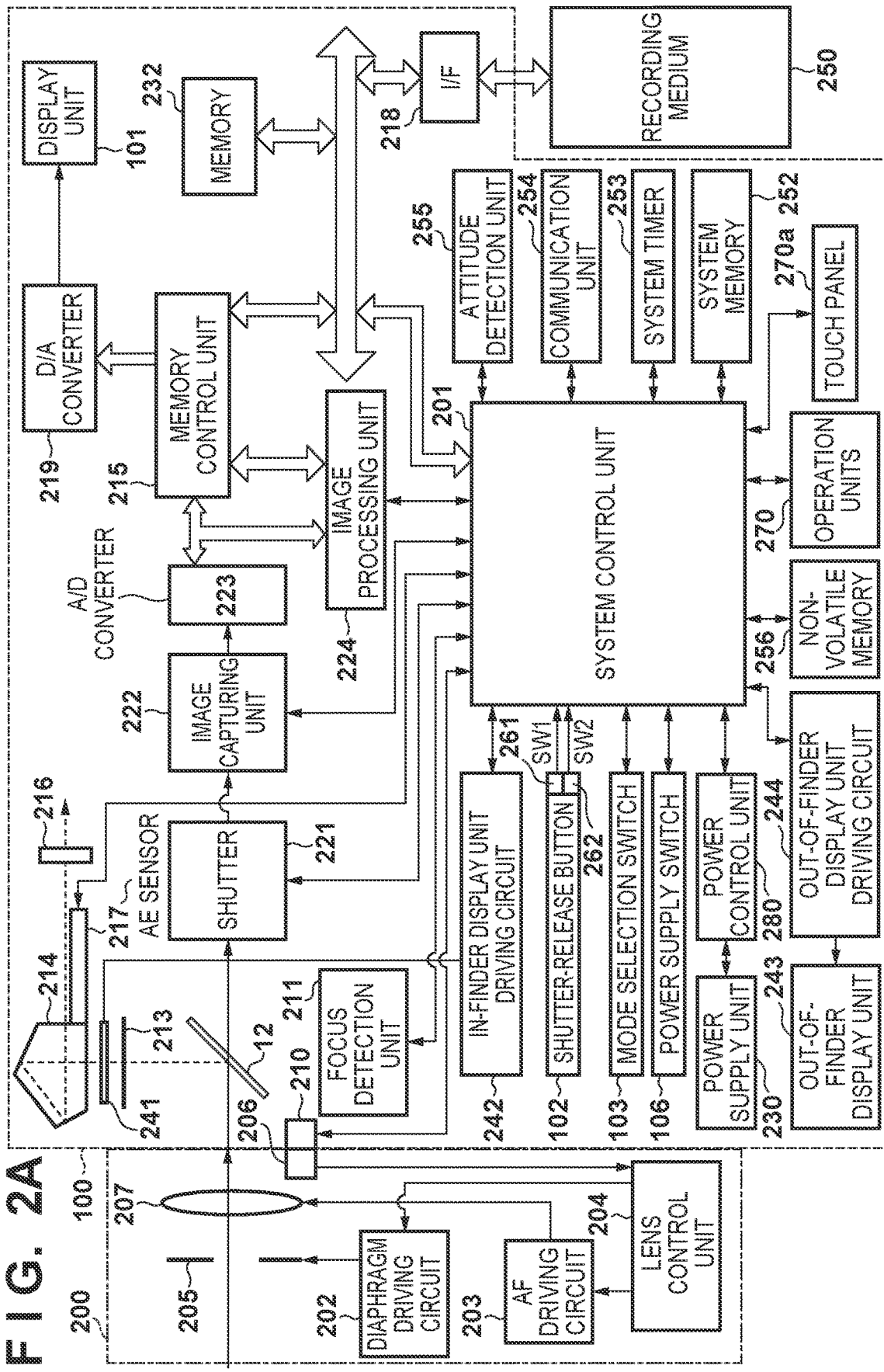
FIGS. 2A and 2B show block diagrams showing the configuration of the image capturing apparatus of the present embodiment.
Figure 2B:
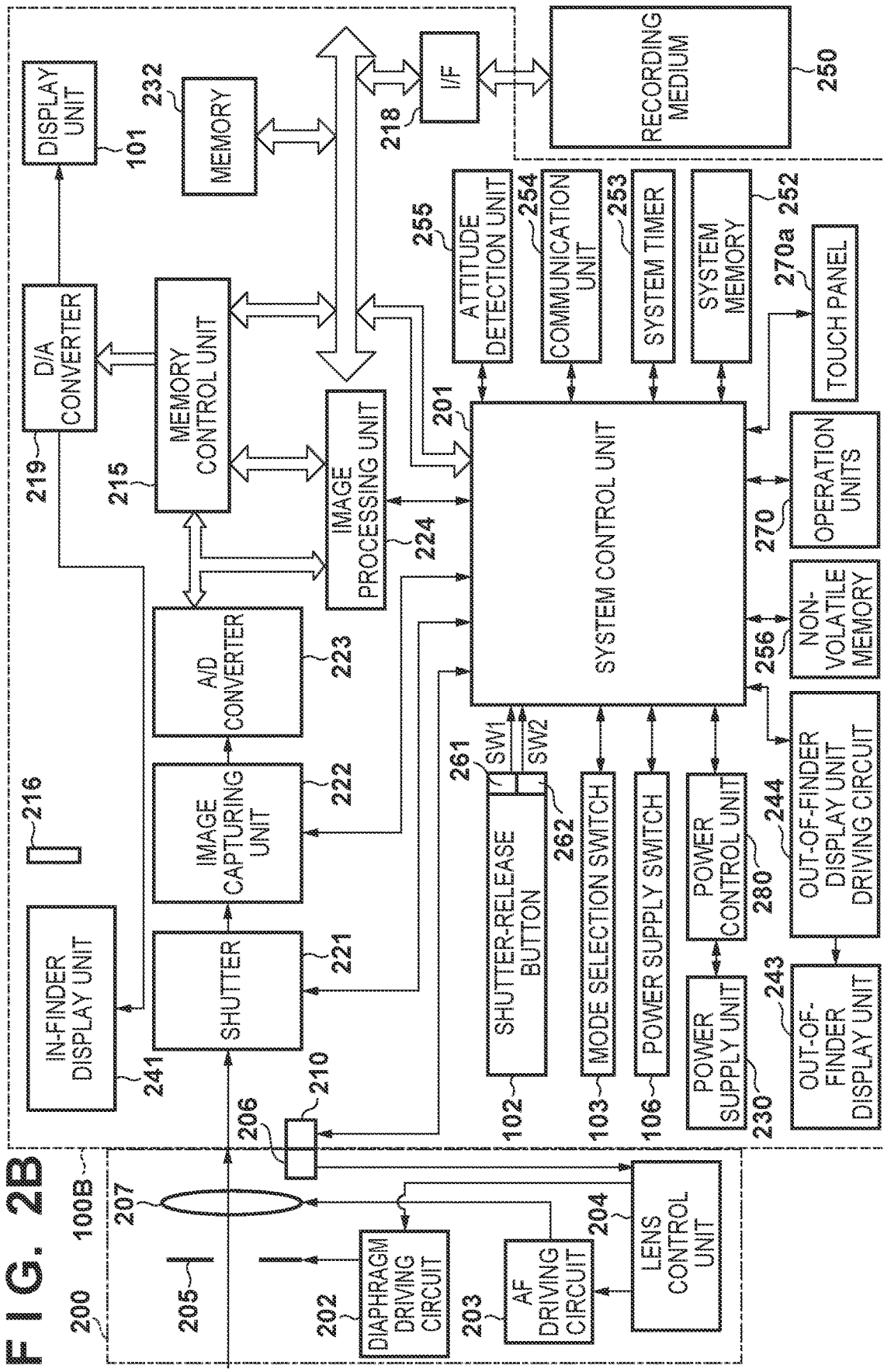

A SET button 109 is a push button also included in the operation units 270 that will be described later with reference to FIGS. 2A and 2B, and is mainly used for determining selection items, and the like. A live view button 110 is also a push button included in the operation units 270 that will be described later with reference to FIGS. 2A and 2B, is used for the switching on/off of live view display in a still image shooting mode, and is used for giving an instruction to start or stop moving image shooting (recording) in a moving image recording mode. An enlargement button 111 is also a push button included in the operation units 270 that will be described later with reference to FIGS. 2A and 2B, and is an operation member for the switching on/off of enlarged display in a live view and changing the magnification during the enlarged display. In addition, the enlargement button 111 is an operation member for enlarging a reproduced image and increasing the magnification in a reproduction mode. A reduction button 114 is also a push button included in the operation units 270 that will be described later, and is an operation member for reducing the magnification of a reproduced image that is enlarged, and displays a screen in a reduced state.

The display destination switch button 112 is also a push button that is included in the operation units 270 that will be described later with reference to FIGS. 2A and 2B, and is an operation member for switching the image display destination to either the backside display unit 101 or the eyepiece viewfinder 216 so as to be visible to the user. By operating the display destination switch button 112, the user can select whether a live view image, which is obtained by capturing an optical image of an object (hereinafter, referred to as an object image), is to be displayed on the backside display unit 101, or whether to observe the object image through the eyepiece viewfinder 216.

A quick return mirror 212 is driven to an upward position (an exposure position) or a downward position (a live view position) by an actuator (not illustrated) in accordance with an instruction from a system control unit 201 that will be described later with reference to FIGS. 2A and 2B. A communication terminal 210 is an electric contact for the digital camera 100 to perform communication with a lens unit 200 (FIGS. 2A and 2B). A look-in eyepiece finder 216 is an optical member for checking, by observing a focusing screen 213 (FIGS. 2A and 2B), the focus and composition of an object image taken in through the lens unit 200. A lid 113 is a member for opening or closing a slot for mounting/removing the recording medium 250 to/from the digital camera 100. A grip 115 has a shape that makes it easy to be grasped by a user's a right hand when he or she holds the digital camera 100.

Next, the internal configuration of the digital camera 100 and lens unit 200 according to the present embodiment will be described with reference to FIGS. 2A and 2B. In FIGS. 2A and 2B, configurations that are the same as in FIGS. 1A and 1B are denoted by the same reference signs.

In FIGS. 2A and 2B, the lens unit 200 is equipped with a shooting lens 207, and is detachable from the digital camera 100. The shooting lens 207 is usually constituted by a plurality of lenses, but is simplified here and is shown by one lens only. A communication terminal 206 is an electric contact for the lens unit 200 to perform communication with the digital camera 100. The communication terminal 210 is an electric contact for the digital camera 100 to perform communication with the lens unit 200. The lens unit 200 performs communication with the system control unit 201 via the communication terminal 206, and a built-in lens control unit 204 controls a diaphragm driving circuit 202 so as to drive a diaphragm aperture 205, and controls an AF driving circuit 203 so as to displace the position of the shooting lens 207, thereby bringing the object image in focus.

An AE sensor 217 performs photometry to obtain the luminance of the object taken in through the lens unit 200. A focus detection unit 211 outputs a defocus amount to the system control unit 201, and the system control unit 201 communicates with the lens unit 200 in accordance with the defocus amount, and performs AF (Automatic Focus) control using a phase difference detection system.

The quick return mirror 212 receives an instruction from the system control unit 201 at the time of exposure, live view display, and moving image shooting, and is driven to the upward position or the downward position by the actuator (not illustrated). The quick return mirror 212 switches luminous flux entering the shooting lens 207 to the eyepiece finder 216 or an image capturing unit 222. The quick return mirror 212 is usually biased toward the downward position so as to reflect the luminous flux and guide the luminous flux to the eyepiece finder 216, but for exposure and live view display, jumps upward and recedes from the luminous flux (to the upward position) so as to guide the luminous flux to the image capturing unit 222. In addition, the central portion of the quick return mirror 212 is a half mirror such that a portion of the luminous flux passes through and enters the focus detection unit 211. The photographer can check, via a pentagonal prism 214 and the eyepiece finder 216, the focus and composition of the object image taken in through the lens unit 200 by observing the focusing screen 213.

A focal plane shutter 221 can freely control the exposure time of the image capturing unit 222 in accordance with an instruction from the system control unit 201. The image capturing unit 222 is an image sensor constituted by an imaging element such as a CCD or a CMOS for converting the object image into electrical signals. A/D converter 223 converts analog signals output from the image capturing unit 222 into digital signals and generates image data.

An image processing unit 224 performs resizing processing, such as predetermined pixel interpolation and reduction, and color conversion processing, with respect to data from the A/D converter 223 or data from a memory control unit 215. Further, the image processing unit 224 performs predetermined calculation processing using the captured image data, and the system control unit 201 performs exposure control and focus control based on the calculation results. Thus, AF (Automatic Focus) processing, AE (Automatic Exposure) processing, and EF (flash pre-emission) processing of TTL (Through the Lens) type are performed. Furthermore, the image processing unit 224 performs predetermined calculation processing using the captured image data, and AWB (Automatic White Balance) processing of TTL type is performed on the basis of the calculation results.

The data from the A/D converter 223 is directly written into a memory 232 via both the image processing unit 224 and the memory control unit 215 or via the memory control unit 215. The memory 232 stores the image data obtained from the image capturing unit 222 and the A/D converter 223, and image display data to be displayed on the backside display unit 101. The memory 232 has a storage capacity that is sufficient for storing a predetermined number of still images as well as moving images and audio for a predetermined time period. The memory 232 also functions as a memory for image display (video memory).

A D/A converter 219 converts the image display data stored in the memory 232 into an analog signal and supplies the backside display unit 101 with the analog signal. The image display data that was written into the memory 232 is displayed by the backside display unit 101 via the D/A converter 219. The backside display unit 101 performs display in accordance with the analog signal from the D/A converter 219. In this manner, the digital signals stored in the memory 232 are converted into analog signals, and the analog signals are successively transmitted to the backside display unit 101 so as to be displayed thereon, making it possible to realize an electronic view finder (EVF) functionality and to perform live view display (through image display).

A frame that indicates a ranging point (AF position) at which AF processing is currently performed, an icon that indicates the setting state of the camera, and the like are displayed on an in-finder display unit 241 via an in-finder display unit driving circuit 242. Accordingly, the user can check the AF position and camera setting state through an optical viewfinder (OVF) that enables an object image picked up by the lens unit 200 to be viewed by looking through the eyepiece viewfinder 216.

Various setting values of the camera such as a shutter speed and a diaphragm aperture are displayed on the out-of-finder display unit 243 via an out-of-finder display unit driving circuit 244.

A nonvolatile memory 256 is, for example, an EEPROM, which is electrically erasable and recordable. In the nonvolatile memory 256, constants and programs, for example, for operating the system control unit 201 are stored. In this context, "programs" may refer to programs for executing various flowcharts that will be described later.

The system control unit 201 has a CPU (Central Processing Unit or a MPU (Micro Processing Unit) for overall controlling the entire digital camera 100, and realizes, by executing the programs stored in the nonvolatile memory 256, the procedures of the flowchart that will be described later. The system memory 252 is, for example, a RAM and used also as a work memory where constants and variables for operating the system control unit 201, and the programs read out from the nonvolatile memory 256 are expanded. The system control unit 201 controls the memory 232, the D/A converter 219, the backside display unit 101, and the like, so as to perform display control. A system timer 253 is a timer circuit for measuring time periods for various types of controls and the time of an integrated clock.

A mode selection switch 103, a first shutter switch 261, a second shutter switch 262, and the operation units 270 are operation members for inputting various types of instructions into the system control unit 201. The mode selection switch 103 switches the operation mode of the system control unit 201 to any of a still image shooting mode, a moving image recording mode, and a reproduction mode. The still image shooting mode includes an automatic shooting mode, an automatic scene determination mode, a manual mode, aperture-priority AE mode (Av mode), shutter-priority AE mode (Tv mode). The still image shooting mode also includes various scene mode each of which scene-specific shooting setting is made, a program AE mode, a custom mode, and the like.

Using the mode selection switch 103, the mode is directly switched to any of the plurality of modes included in the still image shooting mode. Alternatively, it is also possible to switch, using the mode selection switch 103, to the still image shooting mode and then to switch, using another operation member, to any of the plurality of modes included in the still image shooting mode. Similarly, also the moving image recording mode and the reproduction mode may include a plurality of modes.

While the shutter-release button 102 provided on the digital camera 100 is being operated, that is, pressed halfway (the shooting preparation instruction), the first shutter switch 261 is turned on and generates a first shutter switch signal SW1. Upon receiving the first shutter switch signal SW1, the system control unit 201 causes the image processing unit 224 to start the AF (Automatic Focus) processing, the AE (Automatic Exposure) processing, the AWB (Automatic White Balance) processing, the EF (flash pre-emission) processing and the like.

When the operation of the shutter-release button 102 is completed, that is, the shutter-release button 102 is pressed fully (the shooting instruction), the second shutter switch 262 is turned on and generates a second shutter switch signal SW2. Upon receiving the second shutter switch signal SW2, the system control unit 201 starts a series of shooting processing from reading out the signal from the image capturing unit 222 to writing of image data to the recording medium 250.

By selecting items for setting various functions or items representing setting values displayed on the backside display unit 101, appropriate functions for each situation are assigned to the operation units 270, and the operation units 270 thus act as various function buttons. Examples of these function buttons include a menu button, an end button, a back button, an image scrolling button, a jump button, a narrow-down button, and an attribute change button. For example, a menu screen that enables various settings to be made is displayed on the backside display unit 101 by pressing the menu button. The user can make various settings intuitively by using the menu screen, which is displayed on the backside display unit 101, the cross key 108 and the SET button 109.

The operation units 270 are input units which accept a user operation and notify it to the system control unit 201, and includes at least the following operation members: the shutter-release button 102, the main electronic dial 105, the power supply switch 106, the sub electronic dial 107, the cross key 108, the SET button 109, the live view button 110, the enlargement button 111, the display destination switch button 112, and the reduction button 114.

A power control unit 280 is constituted by, for example, a battery detection circuit, a DC-DC converter, a switch circuit for changing over the block to be supplied with power, and detects whether a battery has been inserted or not, the type of the battery, and the residual capacity thereof. Further, the power control unit 280 controls the DC-DC converter in accordance with the detection results and an instruction of the system control unit 201, and supplies a necessary voltage for a necessary length of time to each of the units including the recording medium 250.

A power supply unit 230 comprises a primary battery such as an alkaline battery or a lithium battery, a secondary battery such as a NiCd battery, a NiMH battery, or a Li-ion battery, or an AC adaptor. A recording medium interface (I/F) 218 is for interfacing with the recording medium 250 such as a memory card or a hard disk drive. The recording medium 250 is a recording medium such as a memory card for recording shot images, and constituted by a semiconductor memory, a magnetic disk, or the like.

A communication unit 254 is communicably connected to an external apparatus via a wireless antenna or a wired cable, and transmits and receives video signal or audio signal. The communication unit 254 is also connectable to a wireless LAN (Local Area Network) or the Internet. The communication unit 254 can transmit image data (including a through image) captured by the image capturing unit 222 and an image file stored in the recording medium 250 to the external apparatus, or can receive image data or various other information from the external apparatus.

An attitude detection unit 255 detects the attitude (orientation) of the digital camera 100 with respect to the gravity direction. In this case, based on the attitude detected by the attitude detection unit 255, it is possible to discriminate whether an image captured by the image capturing unit 222 has been shot by setting the digital camera 100 in the landscape or portrait direction. The system control unit 201 can add information about the orientation information corresponding to the attitude detected by the attitude detection unit 255 to the image file of the image captured by the image capturing unit 222, and rotate and record the captured image. An acceleration sensor, gyro sensor and the like may be used as an attitude detection unit 255.

FIG. 2B is a block diagram showing the internal configuration in the case of a mirrorless single-lens reflex digital camera. In FIG. 2B, configurations that are the same as in FIG. 2A are denoted by the same reference signs.

A mirrorless single-lens reflex digital camera 100B has the configuration shown in FIG. 2A, with the exception that the quick return mirror 212, the focusing screen 213, and the pentagonal prism 214 that constitute the optical viewfinder have been omitted. Also, the in-finder display unit 241 displays an image obtained by the image capturing unit 222 capturing an object image formed by the lens unit 200. The photographer can check the focus and composition of the object image picked up by the lens unit 200 by viewing the image displayed by the in-finder display unit 241 through the eyepiece viewfinder 216. The photographer can also check the focus and composition of the object image picked up by the lens unit 200 by viewing a video displayed by the backside display unit 101. By operating the display destination switch button 112, the user can cause the object image to be displayed by either the backside display unit 101 or the in-finder display unit 241, or by both of them.

Included among the operation units 270 is also a touch panel (touch screen) 270a that is capable of detecting a touch operation on the backside display unit 101. The touch panel 270a and the backside display unit 101 can be constructed as a single integrated unit. For example, the touch panel 270a is constructed in such a manner that the transmittance of light will not interfere with the display presented by the backside display unit 101, and it is attached to the uppermost layer of the display face of the backside display unit 101. In addition, input coordinates on the touch panel 270a and display coordinates on the backside display unit 101 are correlated. As a result, a GUI can be constructed that makes it possible for the user to directly manipulate the screen displayed on the backside display unit 101. The system control unit 201 is capable of detecting the following touch operations and conditions performed by contacting the touch panel 270a.

Newly touching of the touch panel 270a by a finger or pen which has not been in contact with the touch panel 270a, that is a start of the touch (referred to as "touch-down" below).

A state in which the touch panel 270a is in contact with a finger or pen (referred to as "touch-on" below).

Movement of a finger or pen while in contact with the touch panel 270a (referred to as "touch-move" below).

Lifting of a finger or pen that has been in contact with the touch panel 270a, that is an end of the touch (referred to as "touch-up" below).

A state in which the touch panel 270a is not being touched at all (referred to as "touch-off" below).

When touch-down is detected, the touch-on state is also detected at the same time. Unless touch-up is detected after touch-down, touch-on usually continues to be detected. Touch-move is also detected in a state where touch-on is being detected. Even if touch-on is being detected, touch-move is not detected unless the touch position moves. After touch-up of all the fingers or a pen that have been in contact is detected, the touch-off state is entered.

These operations/conditions and position coordinates at which the touch panel 270a is being touched by the finger or pen are communicated to the system control unit 201 through an internal bus and, based upon the information thus communicated, the system control unit 201 determines what kind of operation (touch operation) was performed on the touch panel 270a. As for "touch-move", the determination can be made also for every vertical component and horizontal component with regard to the direction of movement of the finger or pen, which is moved on the touch panel 270a, based upon a change in the coordinate position. Further, the system control unit 201 can determine that a slide operation (drag) has been performed if it detects a touch-move over a predetermined distance. An operation in which a finger is touched against the touch panel, swiftly moved a certain distance, and then lifted away will be referred to as a "flick". In other words, a flick is an operation in which a finger is swiftly flicked across the touch panel 270a. If a touch-move with a predetermined distance or higher and a predetermined speed or higher is detected, and then a touch-up is detected, it can be determined that a flick has been performed (it can be determined that a flick was performed in succession to a drag). Furthermore, a touch operation in which the touch panel is touched at multiple locations (for example, two points) at the same time, and then the touch positions are moved closer to each other will be referred to as a "pinch-in", and a touch operation in which the touch positions are moved away from each other will be referred to as a "pinch-out". Pinch-out and pinch-in operations will be collectively referred to as "pinch operations" (or simply "pinching").

The touch panel 270a may employ a method that relies upon any of the following: resistive film, electrostatic capacitance, surface acoustic waves, infrared radiation, electromagnetic induction, image recognition and optical sensing. There are methods in which a touch is detected based on contact with the touch panel, as well as methods in which a touch is detected based on approach of a finger or a pen to the touch panel, and any method may be employed.

Also, if the display destination is switched to the in-finder display unit 241 by the display destination switch button 112, live view images are no longer displayed by the backside display unit 101, but it is possible to accept a touch operation for changing the AF position and camera setting state or the like. In this case, the user can hold the grip 115 with one hand and use a thumb or the like to perform a touch operation on the touch panel 270a while placing the pointer finger on the shutter-release button 102. By performing a touch operation in this way, it is possible to swiftly perform an AF position movement operation and give a shooting instruction while viewing an object image that is displayed by the OVF and the display performed by the in-finder display unit 241 through the eyepiece viewfinder 216. It should be noted that the display that is visible through the eyepiece viewfinder 216 is not limited to being an OVF, and this display may be an electronic viewfinder (EVF) in which the in-finder display unit 241 displays an image captured by the image capturing unit 222. If the in-finder display unit 241 is an EVF, an image captured by the image capturing unit 222 is displayed by the in-finder display unit 241 (a live view image can be displayed), and the user can check the object and the composition by looking through the eyepiece viewfinder 216. In the case of the EVF as well, similarly to the backside display unit 101, the in-finder display unit 241 can display a captured image and also display the AF position and camera setting state and the like.

Note that the hardware configuration is not limited to that shown in FIGS. 2A and 2B, and a configuration is also possible in which, for example, a single item of hardware performs display control, communication control, shooting control, image processing control, and the like, so as to function as each unit or block of the digital camera 100. Alternatively, it is also possible that a plurality of items of hardware operate in cooperation with each other to function as a single unit or block.

Touch Determination Processing at Time of Shooting

Next, touch determination processing performed at the time of shooting by the digital camera 100 of the present embodiment will be described with reference to FIGS. 3A to 8.

FIGS. 3A, 3B, 4A and 4B show an operation procedure of processing in which a setting is changed by a touch operation in the digital camera 100 of the present embodiment. FIGS. 5A to 7G show display examples of the backside display unit 101 and the eyepiece viewfinder 216 at the time of shooting in the digital camera 100 of the present embodiment.

Figure 3A:
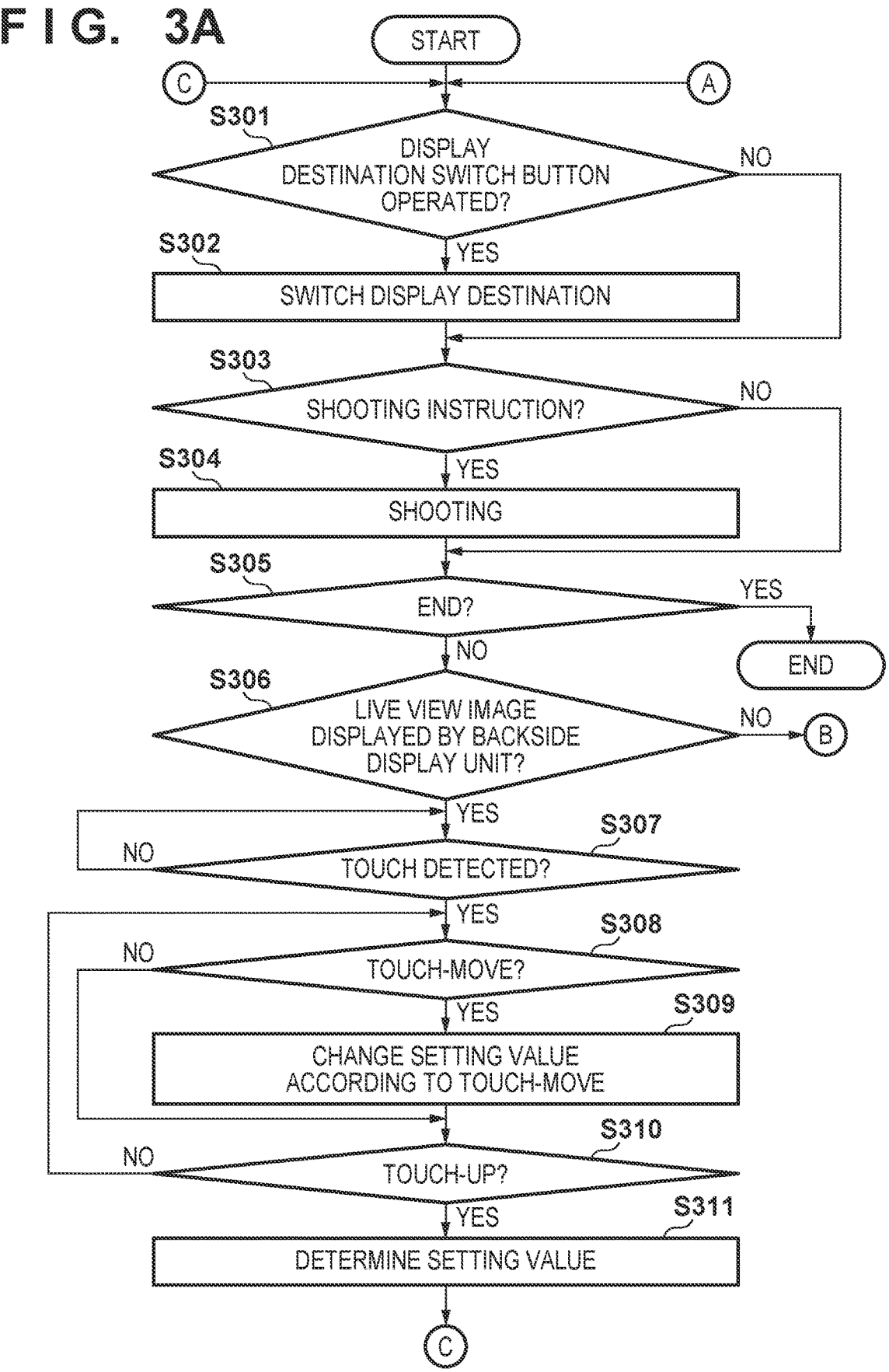
FIGS. 3A and 3B are flowcharts showing processing in which a setting is changed by a touch operation performed at the time of shooting in the present embodiment.
Figure 3B:
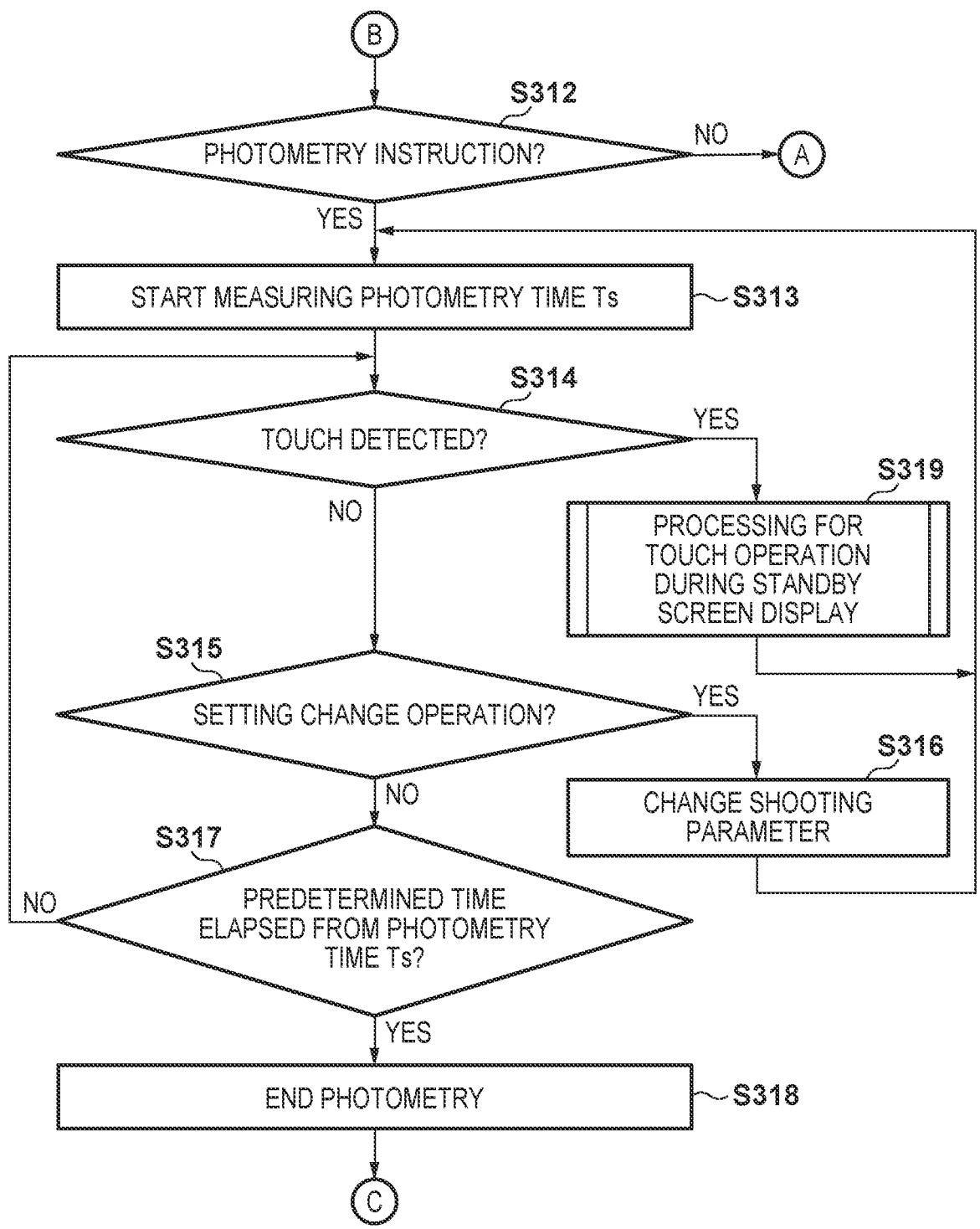
Figure 4A:
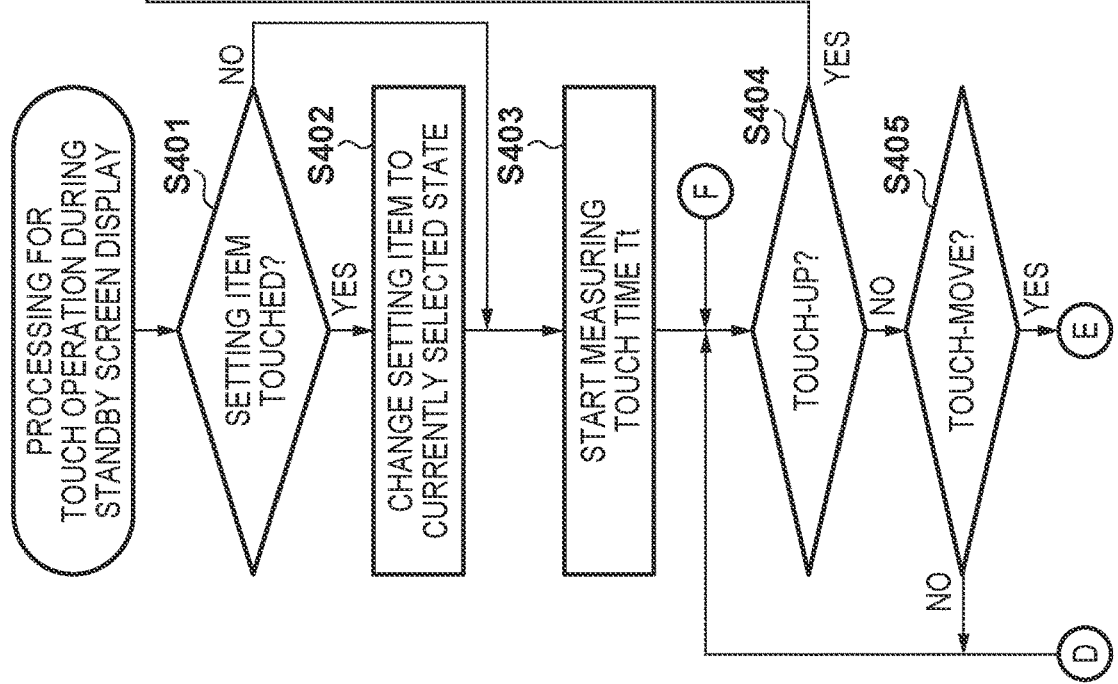
Figure 5A:
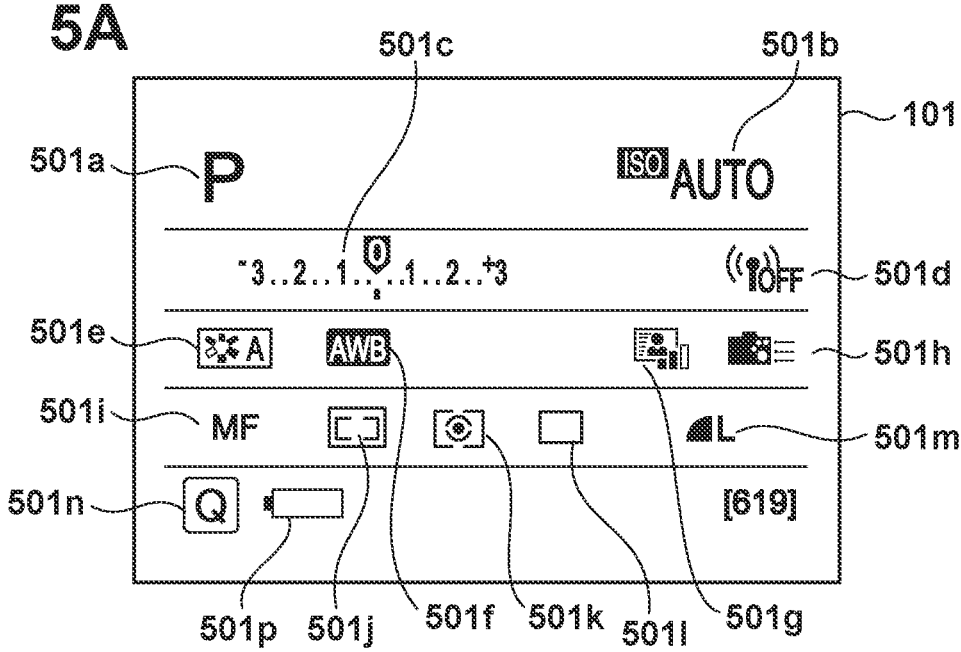
FIGS. 5A to 5G are diagrams showing display examples of a backside display unit and an eyepiece viewfinder in touch determination processing in the present embodiment.
Figure 5B:

The processing in FIGS. 3A, 3B, 4A and 4B is started in a state where a live view mode has been activated by the live view button 110, a standby screen 501 shown in FIG. 5A is displayed by the backside display unit 101, and an object image 502 can be viewed by the OVF in FIG. 5B through the eyepiece viewfinder 216. Also, the processing in these flowcharts is realized by a program stored in the nonvolatile memory 256 being deployed to the system memory 252 and executed by the system control unit 201.

In step S301, the system control unit 201 determines whether or not the display destination switch button 112 has been operated. The procedure moves to step S302 if the display destination switch button 112 has been operated, and moves to step S303 if it has not been operated.

In step S302, the system control unit 201 performs display destination switching. If a display destination switch instruction is given by the display destination switch button 112, that is to say each time the display destination switch button 112 is pushed, a switch is made between a state in which the object image can be viewed by the OVF through the eyepiece viewfinder 216 and a state in which a captured image is displayed by the backside display unit 101.

Figure 5C:
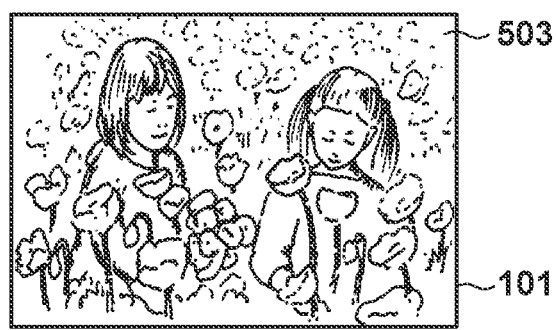
Figure 5D:
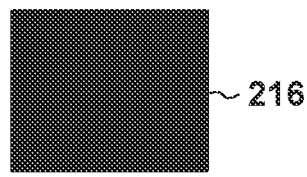

When a standby screen is displayed by the backside display unit 101 as shown in FIG. 5A, an optical object image is visible in the eyepiece viewfinder 216 as shown in FIG. 5B. If a switch instruction is given by the display destination switch button 112, a live view image 503 is displayed by the backside display unit 101 as shown in FIG. 5C, and the object image can no longer be viewed through the eyepiece viewfinder 216 as shown in FIG. 5D. If a display destination switch instruction is given in the case of the display states in FIGS. 5C and 5D, the states shown in FIGS. 5A and 5B are realized.

FIG. 5A shows an example of the standby screen 501 that is displayed by the backside display unit 101. The standby screen 501 shows items for performing setting regarding the camera and shooting, and items indicating setting values. The setting items and setting value items include a shooting mode 501a, an ISO speed 501b, an exposure level 501c, a Wi-Fi function 501d, and a picture style 501e, for example. A white balance 501f, an auto lighting optimizer 501g, and an operation button customization 501h are all included as items. The setting items and setting value items also include an MF/AF operation 501i, an AF frame selection 501j, a photometry mode 501k, a drive mode 501l, and a recording quality 501m. The standby screen 501 also shows items including a function setting button 501n and a remaining battery amount 501p. If the function setting button 501n is touched, or a Q button of the operation units 270 is pushed, a state is realized in which the items from the shooting mode 501a to the recording quality 501m can be selected.

FIG. 5B shows an example of the state where the object image 502 can be viewed by the OVF that is visible through the eyepiece viewfinder 216. When the object image 502 can be viewed through the eyepiece viewfinder 216, it is possible to check the composition of the object image and check the setting values of the setting items displayed by the in-finder display unit 241 in a state of being superimposed on the object image.

FIG. 5C shows an example of the live view image 503 that is displayed by the backside display unit 101.

FIG. 5D shows an example of the state of the OVF that is visible through the eyepiece viewfinder 216 in the state shown in FIG. 5C (the state where the display destination is set to the backside display unit 101). In the state where the display destination has been set to the backside display unit 101 by the display destination switch button 112, the optical path is blocked by the mirror 212 in FIG. 1A, and therefore the object image is not visible on the eyepiece viewfinder 216, and the object image cannot be seen even when looking through the eyepiece viewfinder 216.

In step S303, the system control unit 201 determines whether or not a shooting instruction has been given. The shooting instruction can be given by pushing the shutter-release button 102. The procedure moves to step S304 if the shooting instruction has been given, and moves to step S305 if it has not been given. In step S304, the system control unit 201 executes a series of shooting processing. In shooting processing, the setting values of the setting items that were set in the standby screen 501 (e.g., the shutter speed, the aperture value, and the AF position) are reflected. In other words, a captured image that was captured with the setting values of the setting items, which were set by operations performed on the standby screen 501, is recorded.

In step S305, the system control unit 201 determines whether or not processing for changing a setting by a touch operation is to be ended. Processing for changing a setting by a touch operation is ended by switching off the power supply, changing to the reproduction mode, displaying a menu screen, or the like. If processing for changing a setting by a touch operation is to be ended, this processing is ended, and if otherwise, the procedure moves to step S306.

In step S306, the system control unit 201 determines whether or not a live view image is being displayed by the backside display unit 101. If the live view image 503 is not being displayed by the backside display unit 101, and the standby screen 501 is being displayed as shown in FIG. 5A, the display destination has been set to the eyepiece viewfinder 216, and the user is looking through the eyepiece viewfinder 216, and therefore the procedure moves to step S312. Also, if the live view image 503 is being displayed by the backside display unit 101 as shown in FIG. 5C, the display destination has been set to the backside display unit 101, and the user is viewing the backside display unit 101 (the eyepiece viewfinder 216 is in a non-display state), and therefore the procedure moves to step S307.

In step S307, the system control unit 201 determines whether or not a touch-down (start of a touch operation) has been performed on the backside display unit 101, and the procedure moves to step S308 if a touch-down has been performed.

In step S308, the system control unit 201 determines whether or not a touch-move has been performed in succession to the touch-down detection in step S307. The procedure moves to step S309 if a touch-move has been performed, and moves to step S310 if otherwise.

Figure 5E:
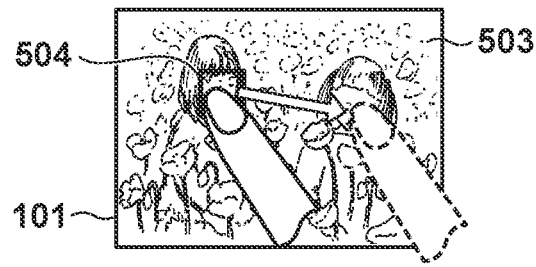
Figure 5F:
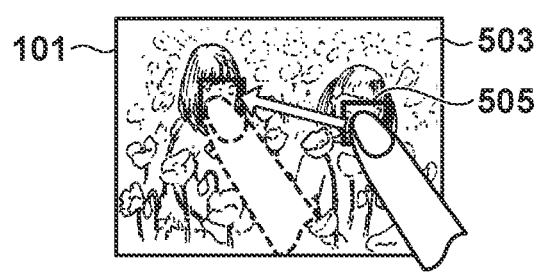

In step S309, the system control unit 201 changes a setting value of a setting item in the live view display in accordance with the touch-move operation, and then the procedure moves to step S310. Setting of the AF position is an example of a change that is made to a setting value of a setting item by a touch-move operation in the live view display. FIGS. 5E and 5F show display examples of the backside display unit 101 before and after a setting is changed by the user performing a touch-move in the state where the live view image 503 is being displayed by the backside display unit 101. FIGS. 5E and 5F show how settings of AF positions (frames) 504 and 505, which are displayed superimposed on the live view image 503, are changed by a touch-move. When the user performs the touch-move on the backside display unit 101 while viewing the live view image 503, the display position of the AF position is changed from the AF position 504 in FIG. 5E to the AF position 505 in FIG. 5F, or from the AF position 505 in FIG. 5F to the AF position 504 in FIG. 5E. By performing the touch-move operation, the frame that indicates the AF position moves, and when the touch is ended, the AF position is set to the position of the frame.

In step S310, the system control unit 201 determines whether or not a touch-up has been detected after the touch-on was detected in step S307. The procedure moves to step S311 if a touch-up has been performed, and returns to step S308 if a touch-up has not been performed.

In step S311, the system control unit 201 performs processing for determining the setting change that was made in step S310 in accordance with the touch-up detected in step S311, and then the procedure returns to step S301.

If the function setting button 501*n* in the standby screen 501 in FIG. 5A is touched, and then a touch-up is performed without a change in the touch position, the function corresponding to the function setting button (function of making the other items in the standby screen selectable) is executed.

Start of Photometry

In step S312, the system control unit 201 determines whether or not a photometry instruction has been given. A photometry instruction can be given by pressing the shutter-release button 102 half-way, and photometry processing can be performed by the AE sensor 217. Note that a photometry instruction can also be given by pushing an AE lock button (button for fixing the exposure) that is not shown, or a stop-down button (button for stopping-down the lens before shooting). The procedure moves to step S313 if the photometry instruction has been given, and returns to step S301 if it has not been given.

In the state where the standby screen 501 shown in FIG. 5A is displayed by the backside display unit 101, and the user is looking through the eyepiece viewfinder 216, if photometry processing is started in step S312, the procedure moves to step S313. Note that the processing of steps S314 onward may be performed even if a photometry instruction has not been given in step S312.

In step S313, the system control unit 201 starts measuring the elapsed time from a photometry start time Ts that is determined in step S312.

In step S314, the system control unit 201 determines whether or not a touch-down has been performed on the backside display unit 101, and if a touch-down has been detected, the procedure moves to processing for the case of a touch operation during standby screen display in step S319 (described later with reference to FIGS. 4A and 4B), whereas if a touch-down has not been detected, the procedure moves to step S315.

In step S315, the system control unit 201 determines whether or not an operation member of the operation units 270 has been used to perform an operation for changing the setting value of a setting item. When items have been made selectable by touching the function setting button 501*n* or pushing the Q button of the operation units 270, it is possible to change the selected item using the cross key 108 (cursor move), and then determine the item using the SET button 109. When an item is determined, the display moves to a screen for the setting of setting items that correspond to the determined item. In the setting item setting screen, a setting value can be changed by performing an operation on the sub electronic dial 107 or the main electronic dial 105. If an operation member of the operation units 270 is used to perform an operation for changing a setting value, the procedure moves to step S316, and if otherwise, the procedure moves to step S317.

In step S316, the system control unit 201 executes processing such as changing a shooting parameter that corresponds to the operation that was determined to be performed on the operation units 270 in step S315, and then the procedure moves to step S313. Settings such as the shooting mode, the ISO speed, and the exposure level can be changed in accordance with an operation performed on the operation units 270.

In step S317, the system control unit 201 determines whether or not a predetermined time has elapsed from the photometry start time Ts that was determined in step S313. If the predetermined time has elapsed, the procedure moves to step S318, and if the predetermined time has not elapsed, the procedure returns to step S314. The predetermined time is a time such as 4 seconds or 10 seconds.

In step S318, the system control unit 201 ends photometry processing, and then the procedure returns to step S310.

Processing in Case of Touch Operation During Standby Screen Display

FIGS. 4A and 4B show processing in the case of a touch operation during standby screen display in step S319 in FIG. 3B. In step S314, if a touch-down has been detected, the backside display unit 101 is in a state of displaying the standby screen 501 as shown in FIG. 5A, and the eyepiece viewfinder 216 is in a state of displaying the object image by the OVF as shown in FIG. 5B.

In step S401, the system control unit 201 determines whether or not the touch-down that was detected in step S314 was a touch-down performed on an item that corresponds to a predetermined setting item included in the standby screen 501 in FIG. 5A. If the touch-down was performed on an item corresponding to a predetermined setting item, the procedure moves to step S402, and if otherwise, the procedure moves to step S403.

In step S402, the system control unit 201 changes the display state of the item corresponding to the setting item subjected to a touch-down in step S401 to the currently-selected display state.

Figure 6B:
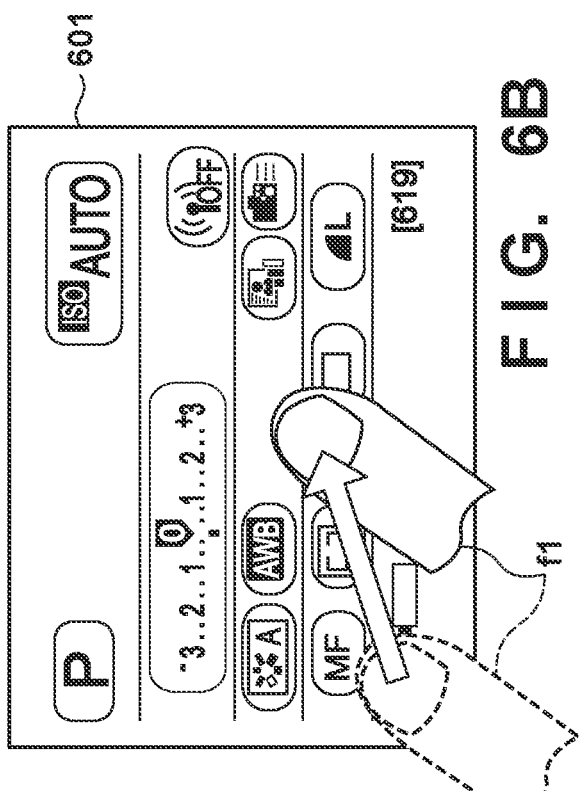
FIGS. 6A to 6H are diagrams showing display examples of the backside display unit in touch determination processing in the present embodiment.
Figure 6D:
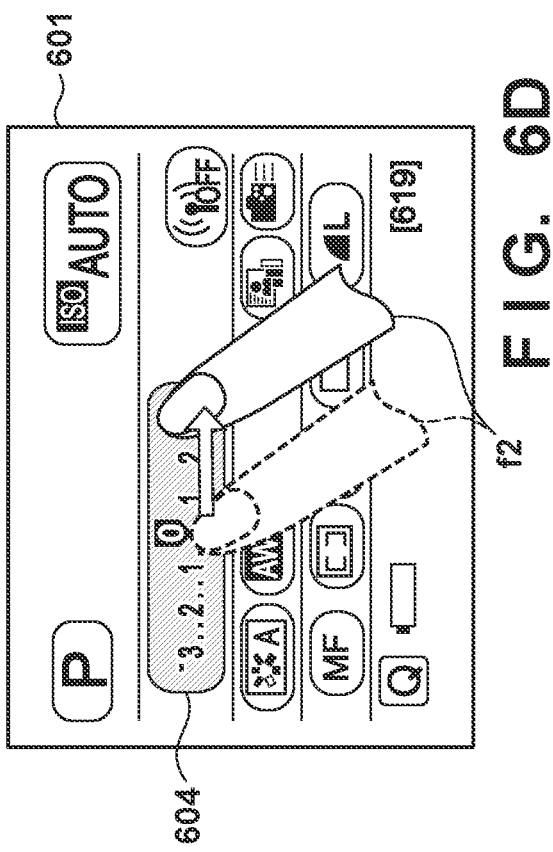
Figure 6A:
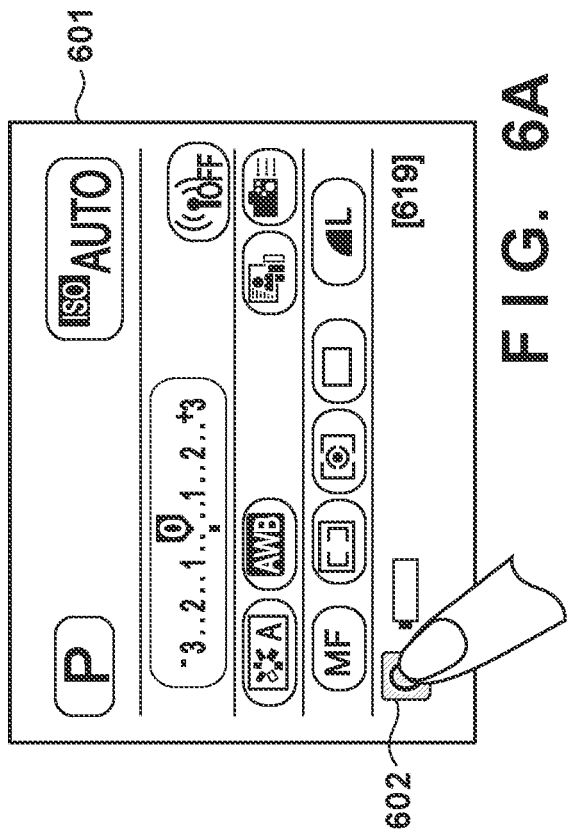

FIG. 6A shows an example in which a setting item 602 in standby screen 501 is being subjected to a touch operation when the standby screen 501 in FIG. 5A is being displayed by the backside display unit 101. FIG. 6A shows an example in which the display state of the item 602 has been changed to the currently-selected display state due to the item 602 being subjected to a touch-down (touch start).

In step S403, the system control unit 201 starts measuring the elapsed time from a touch time Tt at which the touch-down on the item corresponding to the predetermined setting item was detected in step S401.

In step S404, the system control unit 201 determines whether or not a touch-up has been detected after the touch-on was detected in step S401. The procedure moves to step S415 if a touch-up has been performed, and moves to step S405 if a touch-up has not been performed.

In step S405, the system control unit 201 determines whether or not the operation performed in succession to the touch-down detected in step S401 is a touch-move. If the operation is a touch-move, the procedure moves to step S406, and if the operation is not a touch-move, the procedure returns to step S404.

FIGS. 6B to 6E show examples in which a touch-move is performed while a standby screen 601 is being displayed by the backside display unit 101. The user can view the object image when looking through the eyepiece viewfinder 216.

FIG. 6B shows an example in which a touch-move is being performed on the standby screen 601 by a thumb f1. The touch-move in FIG. 6B corresponds to the case where the touch area in the touch-move after the touch start in FIG. 6A is a predetermined area or more, and the touch-move is performed with a predetermined distance or more within a predetermined time from the touch start time. The touch area may be the area that is touched at a single time, or may be the total area that is touched within a predetermined time (e.g., 0.2 seconds or 0.5 seconds).

Figure 6C:
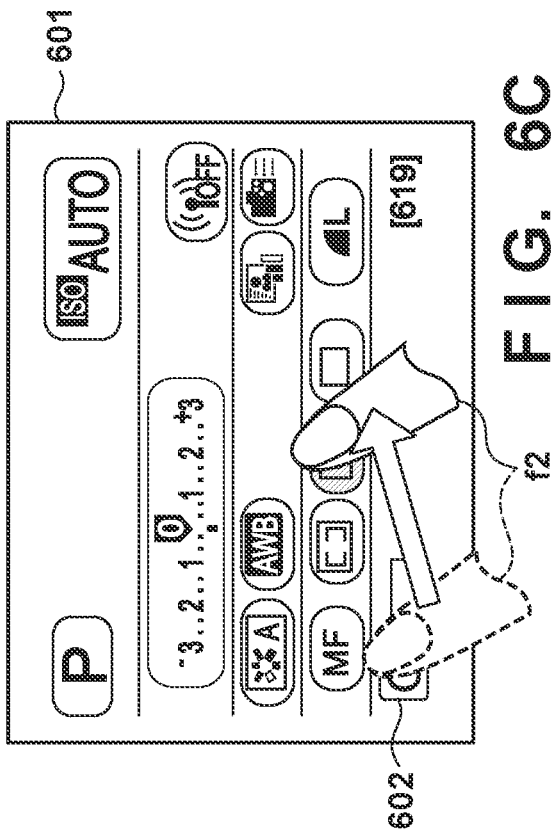

FIG. 6C shows an example in which the standby screen 601 is being displayed by the backside display unit 101, and a touch-move is being performed with a finger other than the thumb f1 (e.g., a pointer finger f2). The touch-move in FIG. 6C corresponds to the case where the touch area in the touch-move after the touch start in FIG. 6A is less than a predetermined area, and the touch-move has not been performed with a predetermined distance or more within a predetermined time from the touch start time. FIG. 6C shows a display example in the case where one item is touched, and then the touch position is moved to a different item.

FIG. 6D shows an example in which the standby screen 601 is being displayed by the backside display unit 101, and a touch-move is being performed on a slide bar 604 on the standby screen 601 with a finger other than the thumb f1 (e.g., the pointer finger f2). FIG. 6D shows an example in which the slide bar 604 is being operated by a touch-move in order to set the exposure level. FIG. 6D is a display example of the case of performing a touch-move on the slide bar.

Figure 6F:
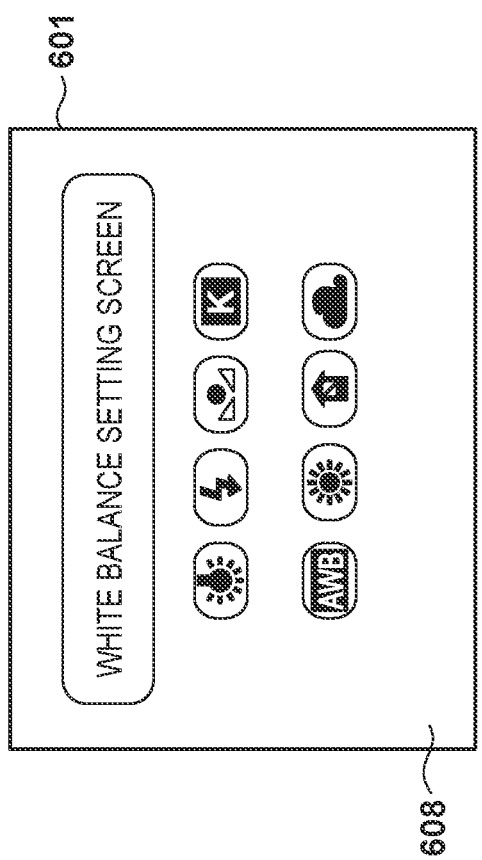
Figure 6E:
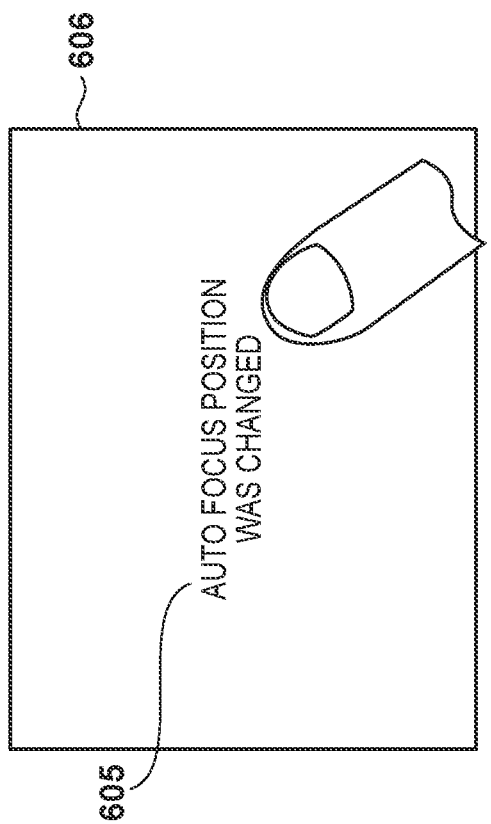

FIG. 6E shows an example in which the standby screen 601 is being displayed by the backside display unit 101, and a touch-move is being performed on the standby screen 601 with a finger other than the thumb f1 (e.g., the pointer finger f2). FIG. 6E shows an example in which an item 602, which was selected by a touch-down in FIG. 6A, is no longer displayed in the currently-selected display state after the touch-move, and has been returned to the normal display state. FIG. 6E is a display example of the case where the touch position is moved from an item to a region in which an item is not displayed.

Note that if a touch-move is detected in step S405, the procedure may move to step S408 without performing the determinations of step S406 and step S407. In other words, in step S405, until a touch-move is performed, the input is absolute coordinate input for selecting the item that corresponds to the touch position, but if the touch position moves as described below, the position corresponding to the touch position is not selected, but rather the input is relative coordinate input for changing the setting value according to the movement amount of the touch position. Specifically, the input is absolute coordinate input at the start of the touch, and after the function setting button 501n is selected (with absolute coordinate input) as shown in the standby screen 501 in FIG. 5A for example, if a touch-move is performed, the AF position is changed according to relative coordinate input. In the case where the AF position is set using relative coordinate input, the AF position is changed based on the movement amount of the touch position (an amount that corresponds to the movement amount of the touch position), not based on the touch start position. At this time, the frame that indicates the AF position on the in-finder display unit 241 is changed according to the touch-move amount, not the AF position displayed on the backside display unit 101. Note that the input is not necessarily required to be relative coordinate input in accordance with the touch-move, and may remain absolute coordinate input. In other words, a configuration is possible in which a position that corresponds to the touch position on the touch panel 270a (the touch position after the touch-move) is selected.

In step S406, the system control unit 201 determines whether or not the touch area in the touch-move that was detected in step S405 is a predetermined area or more. If the touch area is the predetermined area or more, the procedure moves to step S407, and if the touch area is less than the predetermined area, the procedure moves to step S410. In step S406, if the touch-move was performed with the thumb f1 as shown in FIG. 6B, it is determined that the touch area is large (YES in step S406), and if the touch-move was performed with the pointer finger f2 as shown in FIG. 6C, it is determined that the touch area is small (NO in step S406). The predetermined area is an area that is touched within a predetermined time, and is, for example, 7 square centimeters within 0.2 seconds (or it may be determined whether or not the touch movement speed is a predetermined speed or higher). Alternatively, it may be determined whether or not the touch area at the touch-down time (momentary area) is an area that corresponds to a thumb. In other words, it may be determined whether or not the touch area at the touch-down time is two square centimeters.

In the case of the fingers shown in FIGS. 6B and 6C, the touch start positions are the same, and the touch positions after touch position movement are also the same. However, the touch area of the touch operation performed with the thumb f1 shown in FIG. 6B is larger than the touch area of the touch operation performed with the pointer finger f2 shown in FIG. 6C. A touch area threshold is set as a setting value in step S406 for the touch area with the thumb f1 and the touch area with the pointer finger f3, and in the determination in step S406, the result is YES in the case of the touch-move shown in FIG. 6B, and the result is NO in the case of the touch-move shown in FIG. 6C. Even if the touch position moves in the same manner from the touch start position to the end of the movement, the processing from step S406 onward is different, that is to say an operation is performed on an item displayed on the standby screen, or an AF position operation is performed.

In step S407, the system control unit 201 determines whether or not the relationship between an elapsed time t from the touch time Tt in step S403 and a movement distance m of the touch-move satisfies a predetermined condition. If the predetermined condition is satisfied, the procedure moves to step S408, and if the predetermined condition is not satisfied, the procedure returns to step S404. The predetermined condition is that the elapsed time from the touch start is 2 seconds or less (a predetermined time or less), or that the touch position moved by a distance that corresponds to the elapsed time in the case where the elapsed time is 2 seconds or less. In other words, it is determined whether a touch-move was swiftly performed after the touch start, or whether the user has not moved the touch position after the touch start. Accordingly, it can be determined whether or not the user started the touch operation with the intention of performing a touch-move operation at approximately the same time as the touch-down from the beginning.

Figure 8:
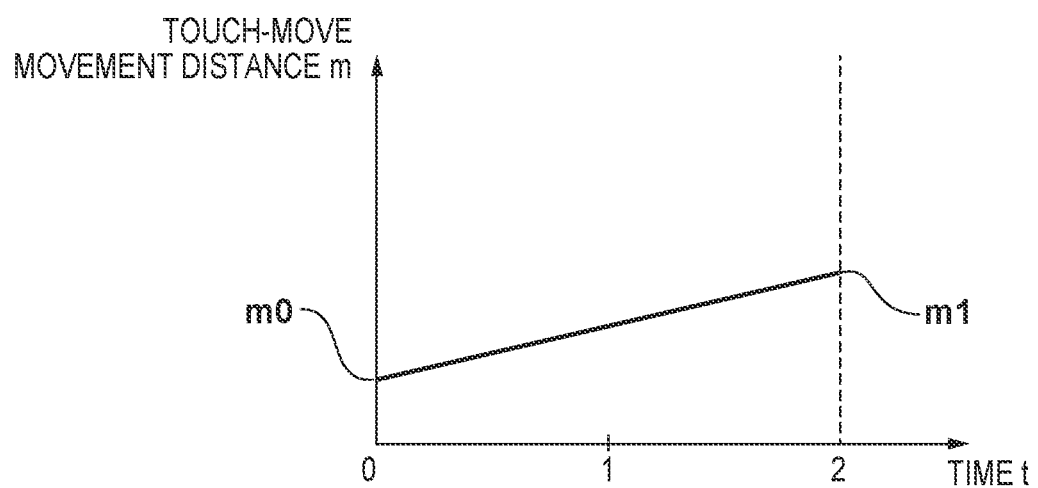
FIG. 8 is a diagram showing an example of a relationship between elapsed time from a touch time and a touch-move movement distance.

FIG. 8 shows an example of the relationship between the elapsed time t since the touch time Tt and the threshold of the touch-move movement distance m. In this figure, the horizontal axis indicates the elapsed time t [seconds] from the touch time Tt, and the vertical axis indicates the touch-move movement distance m [cm] from the touch time Tt to touch-up. In FIG. 8, in the case where $0 \le t \le 2$ is satisfied, if the operation is a touch-move with a movement distance that is greater than or equal to a movement distance corresponding to the touch time Tt, the result of the determination in step S407 is YES. Also, if t>2, regardless of the touch-move movement distance, the result of the determination in step S407 is NO. Note that if t=0, a necessary movement distance m0 is 1 cm or 0.7 cm for example, and if t=2, a necessary movement distance m1 is 2 cm or 1.5 cm for example. A touch operation performed with a finger has a certain area, and therefore the threshold when t=0 is not set to 0 in order to prevent an unintended setting change from being executed. Note that temporal change in the touch-move movement distance m is not change along a straight line as shown in FIG. 8, but rather contains change along a curved line as well.

Note that the determination in step S407 may be made not based on the elapsed time since touch start, but rather based on the elapsed time since movement of the touch position. In the case where the user performs a touch-move to change the AF position while looking through the eyepiece viewfinder 216, there is a high possibility that the user will attempt to move the AF position by performing a touch-move from the beginning. When looking through the viewfinder, it is often the case that setting is performed such that the user gives position input with a relative position (i.e., the selected position does not correspond to the touched coordinate, but rather the setting value is set to a value that corresponds to the touch position movement distance, that is to say the amount of change in movement from the immediately previous setting value). In particular, in the case of position input with a relative position, unless the touch position is moved, the AF position cannot be changed with simply a touch, and therefore there is a high possibility that the user will perform a touch-move immediately after touch start. On the other hand, if the user is performing a touch operation while viewing the standby screen, there is a high possibility that the user will perform an item selection operation by performing a series of operations including first touching a desired item and then performing a touch-up, or that the user will perform an operation while viewing a setting value change bar.

In the case of the fingers show in FIGS. 6B and 6C, the touch start positions are the same, and the touch positions after touch position movement are also the same. However, if it assumed that the touch operation performed with the thumb f1 shown in FIG. 6B satisfies the movement distance corresponding to the touch time in step S407, and the touch operation performed with the pointer finger f2 shown in FIG. 6C does not satisfy the movement distance corresponding to the touch time, different processing will be performed. Specifically, in the determination of step S407, the result in the case of the touch-move shown in FIG. 6B will be YES, and the result in the case of the touch-move shown in FIG. 6C will be NO. Even if the touch position moves in the same manner from the touch start position to the end of the movement, the processing from step S407 onward is different, that is to say an operation is performed on an item displayed on the standby screen, or an AF position operation is performed.

Accordingly, if the user desires to move the AF position while looking through the eyepiece viewfinder 216, the user can perform a desired setting change by starting a touch-move immediately after performing a touch-down. On the other hand, in the case of viewing the backside display unit 101 instead of looking through the eyepiece viewfinder 216, there is a high possibility that the touch-move will be an operation for canceling the touch-down, not an operation for performing a setting change. For this reason, if a predetermined time elapses from the touch-down to the touch-move, the touch operation is invalidated. Accordingly, based on the result of the determination in step S407, it is possible to know that the user is performing an operation while looking through the eyepiece viewfinder 216.

If the touch-move subjected to determination in step S407 is a touch-move with a touch area that is the predetermined area or more as shown in FIG. 6B, and is a touch-move with a predetermined distance or more within a predetermined time from the touch time Tt (YES in step S407), the procedure moves to step S408. Also, if the touch area is small as shown in FIG. 6C, and the touch-move movement distance is less than the predetermined distance (NO in step S407), the system control unit 201 invalidates the touch operation, and the procedure returns to step S404.

In step S408, the system control unit 201 displays, on the backside display unit 101, a display indicating the setting value regarding the AF position was changed, as shown in FIG. 6F. If a change has been made to the setting value of a setting item that is not a setting item displayed on the standby screen, that fact is displayed to the user. If a setting value has been changed by a touch-move performed while looking through the viewfinder, the setting value was changed in accordance with user intention, and therefore the user can view the in-finder display and confirm that the desired setting change was made. On the other hand, in the case where the user is not looking through the viewfinder (does not notice movement of the frame that indicates the AF position in the viewfinder either), if the result of the determinations in step S406 and step S407 is YES, there is a high possibility that the operation is not a user-intended operation. In other words, there is a high possibility that the user desired to perform a touch-move operation so as to change the selection item in the standby screen or change a setting value on a slide bar, but did not realize that the desired setting was not changed, or that the AF position was changed. Accordingly, the user is notified that the AF position was changed. At this time, the items in the standby screen are not displayed in order to make the user aware that an operation for setting a setting item cannot be accepted in the standby screen.

FIG. 6F shows an example of a screen 606 that is displayed when a setting change is made by performing a touch-move while the standby screen 601 is being displayed by the backside display unit 101. FIG. 6F shows an example in which the AF position is changed by performing a touch-move on the backside display unit 101 while the standby screen 601 is being displayed. In this case, a setting change notification 605 is displayed by the backside display unit 101, and the changed AF position is displayed by the in-finder display unit 241. If the user is performing the touch operation while looking through the eyepiece viewfinder 216, it is possible to move the AF position to a desired position while watching movement of the AF position.

In step S409, the system control unit 201 changes the setting value of the setting item being displayed by the in-finder display unit 241 in accordance with the touch-move, and changes the display to reflect the changed setting value, and then the procedure returns to step S404. Note that in this case, the display of the corresponding setting item in the standby screen on the backside display unit 101 is also changed.

Figure 7A:
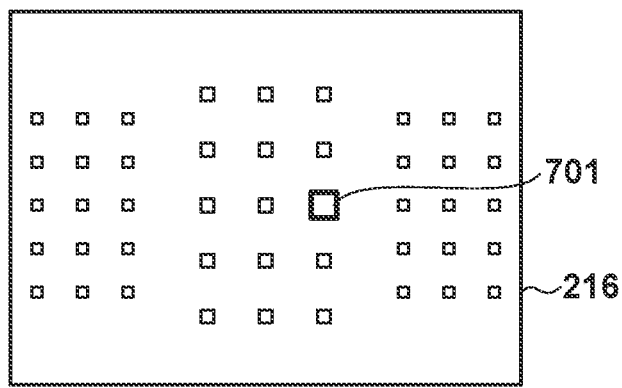
FIGS. 7A to 7G are diagrams showing display examples of the backside display unit and the eyepiece viewfinder in touch determination processing in the present embodiment.
Figure 7B:
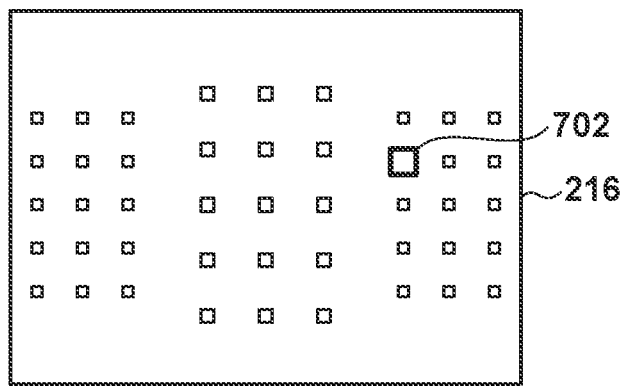

FIGS. 7A and 7B show display examples of the in-finder display unit 241 before and after a setting change is made by a touch-move being performed while the standby screen is being displayed by the backside display unit 101. FIGS. 7A and 7B show examples in which in the case where the object image can be viewed by the OVF in the eyepiece viewfinder 216, the settings of AF positions (frames) 701 and 702, which are being displayed by the in-finder display unit 241 so as to overlap (be superimposed on) the object image, are changed by a touch-move. If a touch-move is performed on the backside display unit 101 while the standby screen is being displayed, a setting change notification 605 shown in FIG. 6F is displayed by the backside display unit 101. Also, the display position of the AF frame in the in-finder display unit 241 is changed from the AF position 701 in FIG. 7A to the AF position 702 in FIG. 7B. If the user is performing the touch operation while looking through the eyepiece viewfinder 216, it is possible to move the AF position to a desired position while watching movement of the AF position. Note that the AF position 701 in FIG. 7A is not necessarily required to be displayed before the touch-move is performed, or the AF position may be displayed in advance. A configuration is possible in which before a touch-move is performed in step S405, if a touch start is detected, the in-finder display unit 241 displays the AF frame in a blinking manner in order to display the current AF position, and a configuration is possible in which the AF position 701 is displayed if the AF frame is not displayed before a touch.

Figure 7C:
Figure 7D:
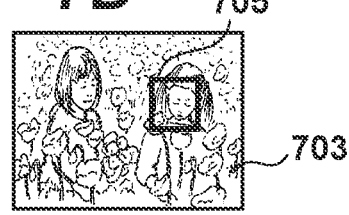

FIGS. 7C and 7D show display examples of the in-finder display unit 241 before and after a setting change is made by performing the touch-move shown in FIG. 6B while the standby screen is being displayed by the backside display unit 101. FIGS. 7C and 7D show an example in which a live view image 703 is being displayed by the EVF in the in-finder display unit 241, and AF positions 704 and 705, which are being displayed by the in-finder display unit 241, are changed by a touch-move. When a touch-move is performed on the backside display unit 101, a setting change notification 605 shown in FIG. 6F is displayed by the backside display unit 101. Also, the display position of the AF frame in the display on the in-finder display unit 241 is changed from the AF position 704 in FIG. 7C to the AF position 705 in FIG. 7D. If the user is performing the touch operation while looking through the eyepiece viewfinder 216, it is possible to move the AF position to a desired position while watching movement of the AF position.

Figure 7E:
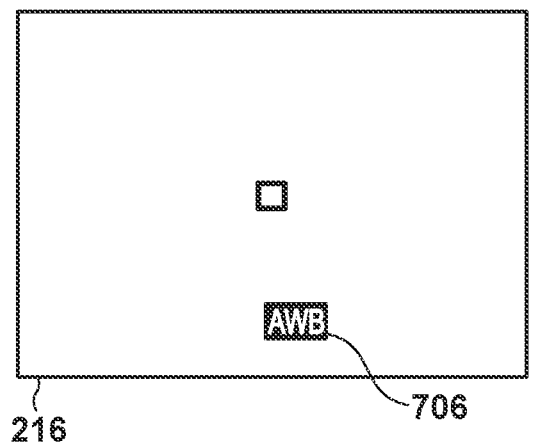
Figure 7F:
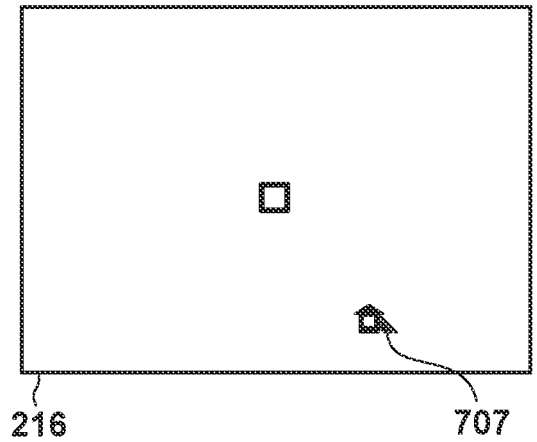
Figure 7G:
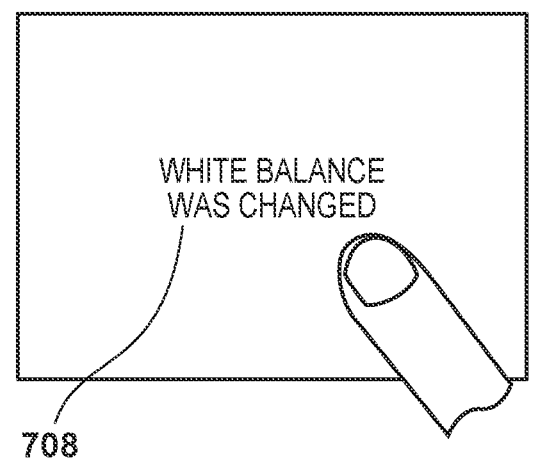

FIGS. 7E and 7F show display examples of the in-finder display unit 241 before and after a setting change is made by performing the touch-move shown in FIG. 6B while the standby screen is being displayed by the backside display unit 101. FIGS. 7E and 7F show examples in which in the case where the object image can be viewed by the OVF in the eyepiece viewfinder 216, the settings of items 706 and 707, which indicate the white balance and are being displayed by the in-finder display unit 241 so as to overlap the object image, are changed by a touch-move. When a touch-move is performed on the backside display unit 101, a setting change notification 708 shown in FIG. 7G is displayed by the backside display unit 101. Also, the white balance setting displayed by the in-finder display unit 241 is changed from the item 706, which indicates the AWB (auto white balance) in FIG. 7E, to the item 707 that indicates another setting value (white balance suitable for shade) in FIG. 7F. If the user is performing the touch operation while looking through the eyepiece viewfinder 216, it is possible to move the AF position to a desired position while watching movement of the AF position.

In this way, by displaying the setting change notification on the backside display unit 101, even if the user is not looking through the eyepiece viewfinder 216, the user can become aware that a setting change was made by a touch-move, and thus it is possible to realize that an unintended setting change was made.

Note that besides the touch-move determinations in step S406 and step S407, a configuration is possible in which it is determined whether or not the touch-move was made in a region that is not a pre-set touch enabled region, and if the result is NO, the procedure moves to step S408.

Also, a configuration is possible in which if changing of the setting of the AF position by a touch-move has been disabled, the processing in FIGS. 4A and 4B is not performed.

Note that a configuration is possible in which even in the case where the results of the touch-move determinations in step S406 and step S407 are NO, if the touch-move movement distance is a predetermined distance or more, the procedure moves to step S408.

Figure 5G:
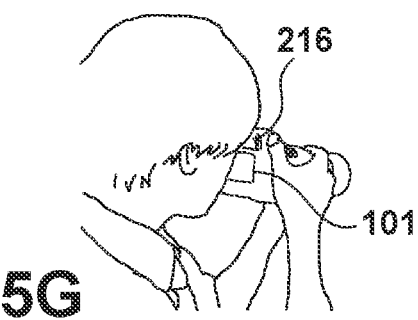

FIG. 5G shows an example of a state in which the user holds the digital camera 100 while looking through the eyepiece viewfinder 216. At the time of shooting, the grip 115 is gripped with the right hand, and the camera body is held with the left hand, and therefore the only finger that can touch the backside display unit 101 is the thumb. In the present embodiment, focus is placed on the fact that the touch area on the touch panel 270a is different between a thumb and a finger other than a thumb, and a setting item such as the AF position can be changed by enabling only a touch-move with a touch area that is a predetermined area or more during photometry. Accordingly, it is possible to prevent the case where a touch-move is performed while not looking through the eyepiece viewfinder 216, and a setting change that is not intended by the user is made.

Processing in Case where Touch Area of Touch-Move is Small

In step S410, the system control unit 201 determines whether or not the touch position after the touch-move in step S405 is another setting item that is not the currently selected setting item (i.e., is not a slide bar). If another setting item is being touched, the procedure moves to step S411, and if otherwise, the procedure moves to step S412. Note that if the determination result is NO in step S401, the processing of step S410 is processing for determining whether or not a position where a setting item is displayed (i.e., not a slide bar) was touched.

In step S411, the system control unit 201 changes the display state of the setting item that was touched in step S410 to the currently-selected display state, and then the procedure moves to step S417.

In steps S410 and S411, if another setting item (shooting mode) 603 is touched after a touch-move performed with the pointer finger f2 having a small touch area as shown in FIG. 6C (YES in step S410) for example, the display state of the touched setting item 603 is changed to the currently-selected display state.

In step S412, the system control unit 201 determines whether or not a touch-move performed on a slide bar included in the standby screen 501 in FIG. 5A has been detected. If a touch-move operation performed on the slide bar has been detected, the procedure moves to step S413, and if otherwise, the procedure moves to step S414. In the case where a touch operation is performed while viewing the standby screen, the touch-move is performed on the slide bar in parallel therewith as shown in the standby screen 601 in FIG. 6D, but in the case of changing the AF position while looking through the viewfinder, the touch-move is often performed in an inclined direction. Accordingly, based on whether the touch-move was performed along the slide bar or not (whether the touch-move was performed in an inclined direction regardless of the item position and the bar direction) as well, it is possible to determine whether the user is performing an operation while looking through the eyepiece viewfinder 216, performing an operation on a displayed item, or attempting to change the AF position.

In step S413, the system control unit 201 changes a setting value in accordance with the touch-move that was detected in step S412, and then the procedure moves to step S404.

In steps S412 and S413, the setting of the exposure level is changed to the setting changed by the touch-move performed on the slide bar (exposure level) 604 included in the standby screen 601 shown in FIG. 6D for example.

In step S414, the system control unit 201 returns the display state of the setting item that was currently selected in step S402 to the normal display state, and then the procedure moves to step S404.

As shown in FIG. 6E, if an item is touched, then a touch-move is performed, and the touch position thereafter is not another item, and furthermore not the slide bar 604 (FIG. 6D), but rather is a position where an item is not displayed, the currently selected setting item is returned to the normal display state, which indicates the non-selected state. If the determination result is NO in steps S410 and S412, neither processing related to the displayed item nor processing for changing the AF position are performed. In the standby screen 501 in FIG. 5A, processing corresponding to a touch operation is not executed outside of the region in which the function setting button 501n is displayed, and therefore the determination result is NO in steps S410 and S412, and neither processing related to the displayed setting item nor processing for changing the AF position are performed. In the case of the standby screen 501 in FIG. 5A, normally, only selection in accordance with a touch performed on the function setting button 501n is performed, and processing corresponding to a touch-move is not performed, but if the determination result is YES in steps S406 and S407, the AF position is changed in accordance with a touch-move.

Processing after Touch-Up

In step S415, the system control unit 201 determines whether or not the change to the setting item in accordance with the touch-move has been completed, and the setting item displayed in the in-finder display unit 241 has been changed. If the setting change has been completed, the procedure moves to step S416, and if it has not been completed, the procedure moves to step S417.

In step S416, the system control unit 201 deletes the setting change notification that was displayed in step S408, and then the processing of FIGS. 4A and 4B is ended, and the procedure moves to step S313.

In step S417, the system control unit 201 determines whether or not a touch-up from the currently selected setting item has been detected. The procedure moves to step S418 if a touch-up has been detected, and moves to step S419 if a touch-up has not been detected.

In step S418, the system control unit 201 executes the function that corresponds to the setting item for which the touch-up was detected in step S417, and then the processing of FIGS. 4A and 4B is ended, and the procedure moves to step S313.

Figure 6H:
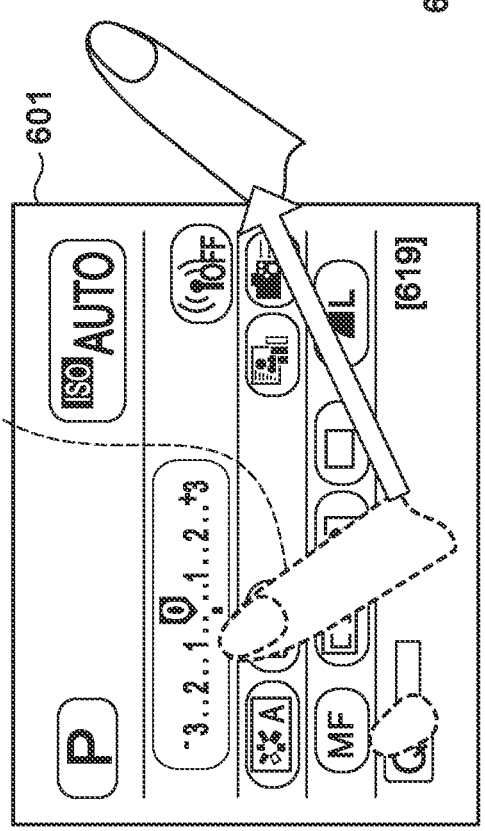
Figure 6G:
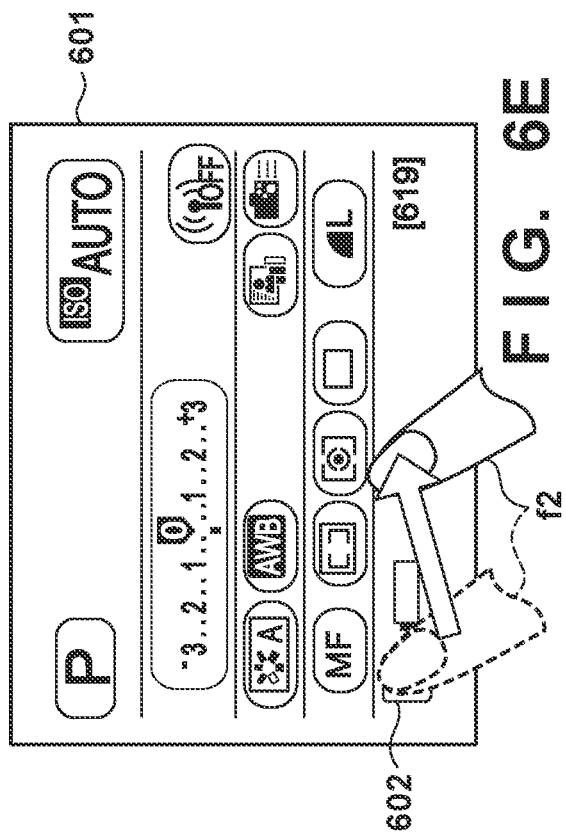

FIG. 6G shows an example of the case where a setting item in the standby screen 601 displayed by the backside display unit 101 is touched, and then a touch-up from the selected setting item is detected. FIG. 6G shows an example of the case where an item 607 indicating the white balance is currently selected by a touch-down performed on the standby screen 601, and then a touch-up is detected without a touch-move being performed. When a touch-up from the currently selected item 607 indicating white balance is detected as shown in FIG. 6G, the function that corresponds to the item 607 is executed, and a white balance setting screen 608 is displayed by the backside display unit 101 as shown in FIG. 6H.

In step S419, the system control unit 201 returns the currently-selected display state of the setting item that was changed in step S402 to the normal display state, and then the processing of FIGS. 4A and 4B is ended, and the procedure moves to step S313.

According to the present embodiment, if the display destination is set to the backside display unit 101, processing is performed with use of absolute coordinates, and if the display destination is set to the eyepiece viewfinder 216, processing is performed with use of relative coordinates with respect to a touch-move that satisfies a predetermined condition. Accordingly, operations performed with absolute coordinates and operations performed with relative coordinates can be automatically switched without the user selecting between operations performed with absolute coordinates and operations performed with relative coordinates. Accordingly, even with an image capturing apparatus that does not have a proximity detection member, the user can perform touch operations with favorable operability while looking through the viewfinder.

Also, the period in which an operation is performed with use of relative coordinates by a touch-move starts when a touch-down is performed on the touch panel 270a during photometry, and ends when a touch-up from the touch panel 270a is performed. It should be noted that if the touch area is smaller than a predetermined area, or if the touch-move movement distance is not larger than a predetermined value within a predetermined time from touch-down, an operation with use of relative coordinates is invalidated.

Note that a configuration is possible in which setting can be performed such that while the user looks through the viewfinder, the touch panel is used as a touchpad, and operations for moving the AF position are enabled. Specifically, a configuration is possible in which setting can be performed such that the live view image is not displayed by the backside display unit, and the selected position of the AF position or the like is moved by a touch operation performed on the backside display unit while the standby screen is being displayed.

Note that in the embodiment described above, operations are performed with relative coordinates in the case where the standby screen is being displayed by the backside display unit, but a configuration is possible in which it is possible to set operations performed with use of absolute coordinates or operations performed with use of relative coordinates.

Also, the touch enabled region may be able to be selected from among the entire screen, right, left, upper right, upper left, lower right, and lower left (effective region setting).

Note that in the description given with reference to FIG. 8, if a touch-move that corresponds to the time from the touch start is performed, the function in the eyepiece is executed, but the function in the eyepiece may be executed if a touch-move with a predetermined distance or more is performed, regardless of the time. In other words, the function in the eyepiece may be executed in the case of a touch-move with a distance of 3 centimeters or more, even if the time from the touch start is less than 2 seconds or greater than or equal to 2 seconds, for example.

In the embodiment described above, if a touch operation that satisfies a predetermined condition is performed on the backside display unit while the standby screen is displayed on the backside display unit, it is possible to change the setting of a setting item that is different from the setting items displayed on the standby screen, such as the AF position setting or the white balance setting. However, the setting item that is changed according to a touch operation that satisfies the predetermined condition while the standby screen is displayed may be a setting item that is displayed on the standby screen.

Furthermore, although examples of changing the settings of the AF position and the white balance have been described, the present invention is also applicable to the ISO speed setting, a "my color" setting, the aspect ratio setting, and the like. Furthermore, the present invention is applicable to the automatic brightness adjustment setting, the HDR setting, the bracket shooting setting, the AF area setting, the grid display setting, the aperture value setting, and the like. In the case of the ISO speed setting, the ISO speed can be switched by a touch-move. It is possible to change the ISO speed setting value from the currently set value to a setting value that was changed in accordance with the touch-move amount. In the case of the automatic brightness adjustment setting, by performing a touch-move operation, it is possible to switch the intensity of the automatic brightness adjustment effect (low, middle, high) for improving the visibility in an image by adjusting the brightness in the image. In the case of the HDR setting, by performing a touch-move operation, it is possible to switch the intensity of the high dynamic range effect. In the case of the automatic brightness adjustment setting and the HDR setting (settings for performing image processing), the intensity of the effect is switched each time a touch-move operation with a predetermined amount is performed. In the case of the bracket shooting setting, by performing a touch-move operation, it is possible to switch between an AE bracket setting for the changing the exposure and then performing shooting, and a WB bracket setting for changing the white balance and then performing shooting. In the case of the AF area setting, it is possible to set the AF position selection method, such as setting only the focus point selected by the user, setting the focus point selected the user and the vicinity thereof, and performing AF processing on a position automatically selected by the camera from among all of the focus points. In the case of the grid display setting, it is possible to switch whether or not to display grid lines on the in-finder display unit 241 in accordance with a touch-down. In the case of the aperture setting, the aperture can be changed according to a touch-move operation. Also, a configuration is possible in which the user can set in advance, on a menu screen, a setting item that can be changed by a touch operation that satisfies a predetermined condition on the standby screen.

Also, in the embodiment described above, it is determined whether the object optical image is visible in the viewfinder, or a live view image is being displayed by the backside display unit. However, there is no limitation to this, and the present invention is also applicable to the case where the viewfinder is an electronic view finder as shown in FIG. 1B.

Note that although the above-described digital camera does not have an eyepiece detection sensor, the above-described embodiment may be applied to a digital camera that has an eyepiece detection sensor. Specifically, after it is determined whether the user is looking through the viewfinder based on an eyepiece detection result, it is determined whether or not a touch operation that has been performed satisfies the predetermined condition described above. Accordingly, it is possible to more accurately determine whether the user is attempting to change the AF position or the like by performing a touch operation on the backside display unit while looking through the viewfinder, or whether the user is close to the viewfinder but attempting to perform an operation on an item that is displayed in the standby screen.

Note that it is not necessarily required that both step S406 and step S407 shown in FIG. 4B are performed, and a configuration is possible in which only one of such determinations is made.

Note that a single item of hardware may control the system control unit 201, or the entire apparatus may be controlled by a plurality of items of hardware sharing processing.

Although the present invention has been elaborated above based on suitable embodiments thereof, the present invention is by no means limited to these specific embodiments and includes various modifications without departing from the concept of the present invention. The above embodiments are merely illustrative embodiments of the present invention, and may be combined where appropriate.

The foregoing embodiments have dealt with an example in which the image capturing apparatus of the present invention is applied to a digital camera 100. However, the present invention is not limited to this example, and is applicable to an image capturing apparatus having a finder function. That is to say, the present invention is applicable to, for example, the following apparatuses: a mobile telephone; a smartphone; a PDA (mobile information terminal); a mobile image viewer; a music player; a game console; an e-book reader; and a medical apparatus, each of which have a finder function. The image capturing apparatus of the present invention is applicable to a digital camera capable of performing control regarding a touch operation to an image capturing apparatus (including a network camera) having a finder function, such as mobile telephone, a smartphone, a tablet PC and a desktop PC.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-002114, filed Jan. 10, 2017, which is hereby incorporated by reference herein in its entirety.

What is claimed is:

1. An image capturing apparatus comprising:
a memory and at least one processor and/or at least one circuit to perform operations of the following units:
a detection unit configured to detect a touch operation performed on a display unit that is arranged out of a viewfinder; and
a control unit configured to control whether to change a display position of a specific item displayed in the viewfinder or to change a setting relating to an item displayed in the display unit in accordance with whether or not a touch position movement operation on the display unit satisfies a predetermined condition,
wherein the control unit controls such that, in a case where an object image is visible via the viewfinder and at least a first item at a first position is displayed on the display unit,
in accordance with detection of a start of touching at the first position on the display unit by the detection unit, the display unit displays that the first item at the first position was touched, and
in accordance with a touch position movement operation that satisfies the predetermined condition being performed after the first position was touched, an in-finder display unit that is visible via the viewfinder changes the position of the specific item according to movement of a touch position from the first position and does not change a setting relating to the first item at the first position, and
wherein the control unit performs control such that, in a case where the first position is a region for changing a setting of a first setting item that is different from the specific item,
if a movement operation for moving the touch position from the first position to a third position that is in the region is performed, and the movement operation does not satisfy the predetermined condition, in accordance with the movement operation for moving the touch position, the first setting item is set according to the third position, and
if the movement operation for moving the touch position from the first position to the third position is performed, and the movement operation satisfies the predetermined condition, even though the movement operation for moving the touch position was performed, the setting of the first setting item is not changed, and the setting of the specific item is changed.

2. The apparatus according to claim 1, wherein
the control unit performs control such that, in a case where after the first position was touched, the touch position is moved from the first position to a second position,
if the touch position movement operation does not satisfy the predetermined condition, the display unit displays that an item at the second position was touched, and
if the touch position movement operation satisfies the predetermined condition, the in-finder display unit displays that the setting of the specific item is changed according to movement of the touch position from the first position to the second position.

3. The apparatus according to claim 1, wherein
the control unit performs control such that the setting of the specific item is not changed according to a touch start position of the touch position movement operation that satisfies the predetermined condition, and the setting of the specific item is changed based on the touch position movement operation.

4. The apparatus according to claim 1, wherein
the control unit performs control such that after an item that corresponds to the first position is selected, if a touch operation for moving the touch position from the first position does not satisfy the predetermined condition, the setting of the specific item is not changed.

5. The apparatus according to claim 1, wherein
the control unit performs control such that if touching is ended without movement of the touch position from the first position, a function of the first item at the first position is executed.

6. The apparatus according to claim 1, wherein
the specific item is a setting item for setting an AF position, and
the control unit performs control such that the AF position is changed according to movement of the touch position from the first position that satisfies the predetermined condition.

7. The apparatus according to claim 1, wherein
the predetermined condition includes a condition that a touch area of the touch position movement operation detected by the detection unit is greater than or equal to a predetermined area.

8. The apparatus according to claim 7, wherein
the touch area of the touch position movement operation is a total area in which touching was detected by the detection unit within a first time.

9. The apparatus according to claim 1, wherein
the predetermined condition includes a condition that a movement distance of the touch position in the touch position movement operation is greater than or equal to a predetermined distance.

10. The apparatus according to claim 1, wherein
the predetermined condition includes a condition that a movement distance of the touch position in the touch position movement operation is greater than or equal to a predetermined distance in a second time.

11. The apparatus according to claim 9, wherein
the predetermined distance is greater than a threshold for determining that the touch position was moved.

12. The apparatus according to claim 1, wherein
the predetermined condition includes a condition that a time from a start of touching to movement of the touch position is less than or equal to a third time.

13. The apparatus according to claim 1, wherein the control unit performs control such that in accordance with a start of touching of the display unit, the in-finder display unit displays the setting of the specific item.

14. The apparatus according to claim 1, wherein
the control performed by the control unit is performed in a case where an elapsed time from when photometry processing is started until when touching of the display unit is detected is less than or equal to a predetermined time.

15. The apparatus according to claim 1, further comprising a switching unit configured to switch between making the object image visible and not visible via the viewfinder.

16. The apparatus according to claim 15, wherein
the control unit performs control such that, in a case where the object image is not visible via the viewfinder, and furthermore a live view image is displayed by the display unit,
if the touch position movement operation is performed, the display unit displays the touch position regardless of whether or not the touch position movement operation satisfies the predetermined condition.

17. The apparatus according to claim 1, wherein
the control unit performs control such that, in accordance with changing of the setting of the specific item, the display unit also displays that the setting of the specific item was changed.

18. The apparatus according to claim 1, wherein
the control unit performs control such that the specific item is set to a setting value that is different from a setting value that was set before the touch position movement operation that satisfies the predetermined condition, by a change amount that is based on a touch position movement distance and a movement direction in the touch position movement operation.

19. The apparatus according to claim 1, wherein
the control unit performs control such that the setting of the specific item is changed according to the touch position after movement from a touch start position in the touch position movement operation that satisfies the predetermined condition, regardless of a setting value that was set before the touch position movement operation that satisfies the predetermined condition.

20. The apparatus according to claim 1, wherein
the viewfinder is an optical viewfinder, and
a display performed by the in-finder display unit is superimposed on an optical image of an object that is visible via the viewfinder.

21. The apparatus according to claim 1, wherein
the viewfinder is an electronic view finder, and a live view image can be displayed by the in-finder display unit.

22. The apparatus according to claim 1, wherein
the specific item is any of an ISO speed setting, an automatic brightness adjustment setting, an HDR setting, a bracket shooting setting, an AF area setting, a grid display setting, and an aperture value setting.

23. The apparatus according to claim 1, wherein a unit configured to detect viewing of the viewfinder is not provided.

24. A control method of an image capturing apparatus which has a detection unit configured to detect a touch operation performed on a display unit that is arranged out of a viewfinder, the method comprising:

controlling whether to change a display position of a specific item displayed in the viewfinder or to change a setting relating to an item displayed in the display unit in accordance with whether or not a touch position movement operation on the display unit satisfies a predetermined condition, wherein controlling includes, in a case where an object image is visible via the viewfinder and at least a first item at a first position is displayed on the display unit,
  in accordance with detection of a start of touching at the first position on the display unit by the detection unit, displaying on the display unit that the first item at the first position was touched, and in accordance with a touch position movement operation that satisfies the predetermined condition being performed after the first position was touched, displaying on an in-finder display unit, which is visible via the viewfinder changes the position of the specific item according to movement of a touch position from the first position and does not change a setting relating to the first item at the first position, and wherein it is controlled such that, in a case where the first position is a region for changing a setting of a first setting item that is different from the specific item,
  if a movement operation for moving the touch position from the first position to a third position that is in the region is performed, and the movement operation does not satisfy the predetermined condition, in accordance with the movement operation for moving the touch position, the first setting item is set according to the third position, and
  if the movement operation for moving the touch position from the first position to the third position is performed, and the movement operation satisfies the predetermined condition, even though the movement operation for moving the touch position was performed, the setting of the first setting item is not changed, and the setting of the specific item is changed.

25. A non-transitory computer-readable storage medium storing a program for causing a computer to execute a control method of an image capturing apparatus which has a detection unit configured to detect a touch operation performed on a display unit that is arranged out of a viewfinder, the method comprising:

controlling whether to change a display position of a specific item displayed in the viewfinder or to change a setting relating to an item displayed in the display unit in accordance with whether or not a touch position movement operation on the display unit satisfies a predetermined condition, wherein controlling includes, in a case where an object image is visible via the viewfinder and at least a first item at a first position is displayed on the display unit,
  in accordance with detection of a start of touching at the first position on the display unit by the detection unit, displaying on the display unit that the first item at the first position was touched, and in accordance with a touch position movement operation that satisfies the predetermined condition being performed after the first position was touched, displaying on an in-finder display unit, which is visible via the viewfinder changes the position of the specific item according to movement of a touch position from the first position and does not change a setting relating to the first item at the first position, and wherein it is controlled such that, in a case where the first position is a region for changing a setting of a first setting item that is different from the specific item,
  if a movement operation for moving the touch position from the first position to a third position that is in the region is performed, and the movement operation does not satisfy the predetermined condition, in accordance with the movement operation for moving the touch position, the first setting item is set according to the third position, and
  if the movement operation for moving the touch position from the first position to the third position is performed, and the movement operation satisfies the predetermined condition, even though the movement operation for moving the touch position was performed, the setting of the first setting item is not changed, and the setting of the specific item is changed.

* * * * *